(12) United States Patent
Guo et al.

(10) Patent No.: US 11,500,832 B2
(45) Date of Patent: Nov. 15, 2022

(54) DATA MANAGEMENT METHOD AND SERVER

(71) Applicant: TENCENT TECHNOLOGY (SHENZHEN) COMPANY LIMITED, Guangdong (CN)

(72) Inventors: Qing Nan Guo, Shenzhen (CN); Yue Sen Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 262 days.

(21) Appl. No.: 16/289,808

(22) Filed: Mar. 1, 2019

(65) Prior Publication Data

US 2019/0197027 A1  Jun. 27, 2019

Related U.S. Application Data

(63) Continuation of application No. PCT/CN2017/116144, filed on Dec. 14, 2017.

(30) Foreign Application Priority Data

Dec. 19, 2016 (CN) .......................... 201611178078.8
Dec. 19, 2016 (CN) .......................... 201611178079.2

(51) Int. Cl.
  *G06F 16/00*   (2019.01)
  *G06F 16/21*   (2019.01)
  *G06F 16/27*   (2019.01)
(52) U.S. Cl.
  CPC ............ *G06F 16/214* (2019.01); *G06F 16/27* (2019.01)

(58) Field of Classification Search
  CPC ............................... G06F 16/214; G06F 16/27
  (Continued)

(56) References Cited

U.S. PATENT DOCUMENTS 8,489,632 B1 * 7/2013 Breckenridge ..... G06F 16/2465
                                                     707/777
10,678,758 B2 * 6/2020 Dornemann .......... G06F 16/258
  (Continued)

FOREIGN PATENT DOCUMENTS

CN    103823812 A    5/2014
CN    104598531 A    5/2015
  (Continued)

OTHER PUBLICATIONS

International Search Report of PCT/CN2017/116144 dated Mar. 14, 2018.
  (Continued)

*Primary Examiner* — Irete F Ehichioya
*Assistant Examiner* — Shirley D Hicks
(74) *Attorney, Agent, or Firm* — Sughrue Mion, PLLC

(57) ABSTRACT

A data management method is provided. To-be-migrated base data in a first service data set is obtained, mirror data that are same as the base data are generated, and the base data to a second service data set are migrated. Incremental data obtained for the base data are recorded in the migration process of the base data. Adding processing is performed on the mirror data by using the incremental data, and the incremental data are migrated to the second service data set, when the migration process of the base data is completed. The mirror data and the incremental data in the first service data set are cleared when the migration process of the incremental data is completed.

20 Claims, 15 Drawing Sheets

(58) Field of Classification Search
USPC .................................................. 707/600–899
See application file for complete search history.

(56) References Cited

U.S. PATENT DOCUMENTS

| | | | | |
|---|---|---|---|---|
| 2007/0055840 A1* | 3/2007 | Yamamoto | .............. | G06F 3/067 |
| | | | | 711/170 |
| 2009/0292788 A1* | 11/2009 | Miyamae | ............ | H04L 67/1095 |
| | | | | 709/211 |
| 2011/0283045 A1* | 11/2011 | Krishnan | ................ | G06F 9/544 |
| | | | | 711/E12.008 |
| 2016/0063050 A1* | 3/2016 | Schoen | ................. | G06F 16/214 |
| | | | | 707/690 |
| 2017/0090777 A1* | 3/2017 | Horn | ..................... | G06F 3/0608 |

FOREIGN PATENT DOCUMENTS

| | | | | | |
|---|---|---|---|---|---|
| CN | 105320681 A | * | 2/2016 | ............. | G06F 16/27 |
| CN | 105472045 A | * | 4/2016 | ............. | G06F 16/90 |
| CN | 105718570 A | | 6/2016 | | |
| CN | 105718570 A | * | 6/2016 | ........... | G06F 16/214 |
| CN | 105868343 A | * | 8/2016 | ........... | G06F 16/214 |
| CN | 105868343 A | | 8/2016 | | |
| CN | 105868421 A | | 8/2016 | | |
| CN | 107122361 A | * | 9/2017 | ........... | G06F 16/214 |

OTHER PUBLICATIONS

Written Opinion dated Mar. 14, 2018 from International Searching Authority in International Application v No. PCT/CN2017/116144.

\* cited by examiner

DATA MANAGEMENT METHOD AND SERVER

CROSS-REFERENCE TO RELATED APPLICATION(S)

This application is a continuation of International Application No. PCT/CN2017/116144, filed on Dec. 14, 2017, in the Chinese Patent Office, which claims priorities to Chinese Patent Application No. 201611178078.8, entitled "DATA MANAGEMENT METHOD AND DEVICE THEREOF" and filed with the Chinese Patent Office on Dec. 19, 2016, and Chinese Patent Application No. 201611178079.2, entitled "DATA SYNCHRONIZATION METHOD AND APPARATUS" and filed with the Chinese Patent Office on Dec. 19, 2016, the disclosures of which are incorporated herein by reference in their entireties.

BACKGROUND

1. Field

Exemplary embodiments relate to the field of Internet technologies, and in particular, to a data management method and a server.

2. Description of the Related Art

With continuous development and improvement of Internet technologies, a data volume of various service data (for example, transaction flow data and call record data) gradually increases, and a background database system needs to be used to store the various service data.

In an existing database system, a management manner of hot data that is frequently accessed and cold data that is less frequently accessed is proposed. For example, for service data having time validity, based on the assumption that data that is relatively old is less frequently accessed, service data generated recently (for example, service data in recent four months) and service data other than the recently generated service data (for example, service data generated more than four months ago) are respectively stored by using a time range as a boundary.

SUMMARY

One or more exemplary embodiments provide a data management method and a server, to implement online migration of service data, improve efficiency of data processing on the service data, for example, query and modification, thereby quality of service is ensured.

According to an aspect of an exemplary embodiment, provided is a data management method, performed by a sever. To-be-migrated base data in a first service data set are obtained, mirror data that are same as the base data are generated, and a migration process that migrates the base data to a second service data set is performed. Incremental data obtained for the base data are recorded in the migration process of the base data. Adding processing is performed on the mirror data by using the incremental data, and the incremental data are migrated to the second service data set, in response to the migration process of the base data being completed. The mirror data and the incremental data in the first service data set are cleared in response to the migration process of the incremental data being completed, the first service data set being a current service data set stored within a preset time period, and the second service data set being a historical service data set stored more than the preset time period.

According to an aspect of another exemplary embodiment, provided is a server including at least one processor and at least one memory, the at least one memory storing instructions that can be executed by the at least one processor, and when executing the instructions, the at least one processor being configured to: obtain to-be-migrated base data in a first service data set, generate mirror data that are same as the base data, and perform a migration process that migrates the base data to a second service data set; record incremental data obtained for the base data in the migration process of the base data; perform adding processing on the mirror data by using the incremental data, and migrate the incremental data to the second service data set, in response to the migration process of the base data being completed; and clear the mirror data and the incremental data in the first service data set in response to the migration process of the incremental data being completed, the first service data set being a current service data set stored within a preset time period, and the second service data set being a historical service data set stored more than the preset time period.

According to an aspect of still another exemplary embodiment, provided is a non-transitory computer readable storage medium, storing computer readable instructions, which, when executed by at least one processor, cause the at least one processor to perform: obtain to-be-migrated base data in a first service data set, generate mirror data that are same as the base data, and perform a migration process that migrates the base data to a second service data set; record incremental data obtained for the base data in the migration process of the base data; perform adding processing on the mirror data by using the incremental data, and migrate the incremental data to the second service data set, in response to the migration process of the base data being completed; and clear the mirror data and the incremental data in the first service data set in response to the migration process of the incremental data being completed, the first service data set being a current service data set stored within a preset time period, and the second service data set being a historical service data set stored more than the preset time period.

BRIEF DESCRIPTION OF THE DRAWINGS

The above and/or other aspects will become apparent and more readily appreciated by describing certain exemplary embodiments with reference to the accompanying drawings, in which.

DETAILED DESCRIPTION

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

During use of a management manner of hot data that is frequently accessed and cold data that is less frequently accessed, hot data may become old data as time passes. In this case, a service usually needs to be suspended, and a storage node and a route for the corresponding hot data that becomes old data are switched to transfer the corresponding hot data. Time during which the service is suspended is determined by a data volume of the hot data that needs to be transferred. Accordingly, when the data volume of the hot data is relatively large, quality of service may be affected due to the suspension, and efficiency of data processing on service data, for example, query and modification, is lowered.

To better understand a data management method and a server disclosed in the embodiments, the following first describes an architecture of data management that is applicable to the embodiments.

Figure 1:
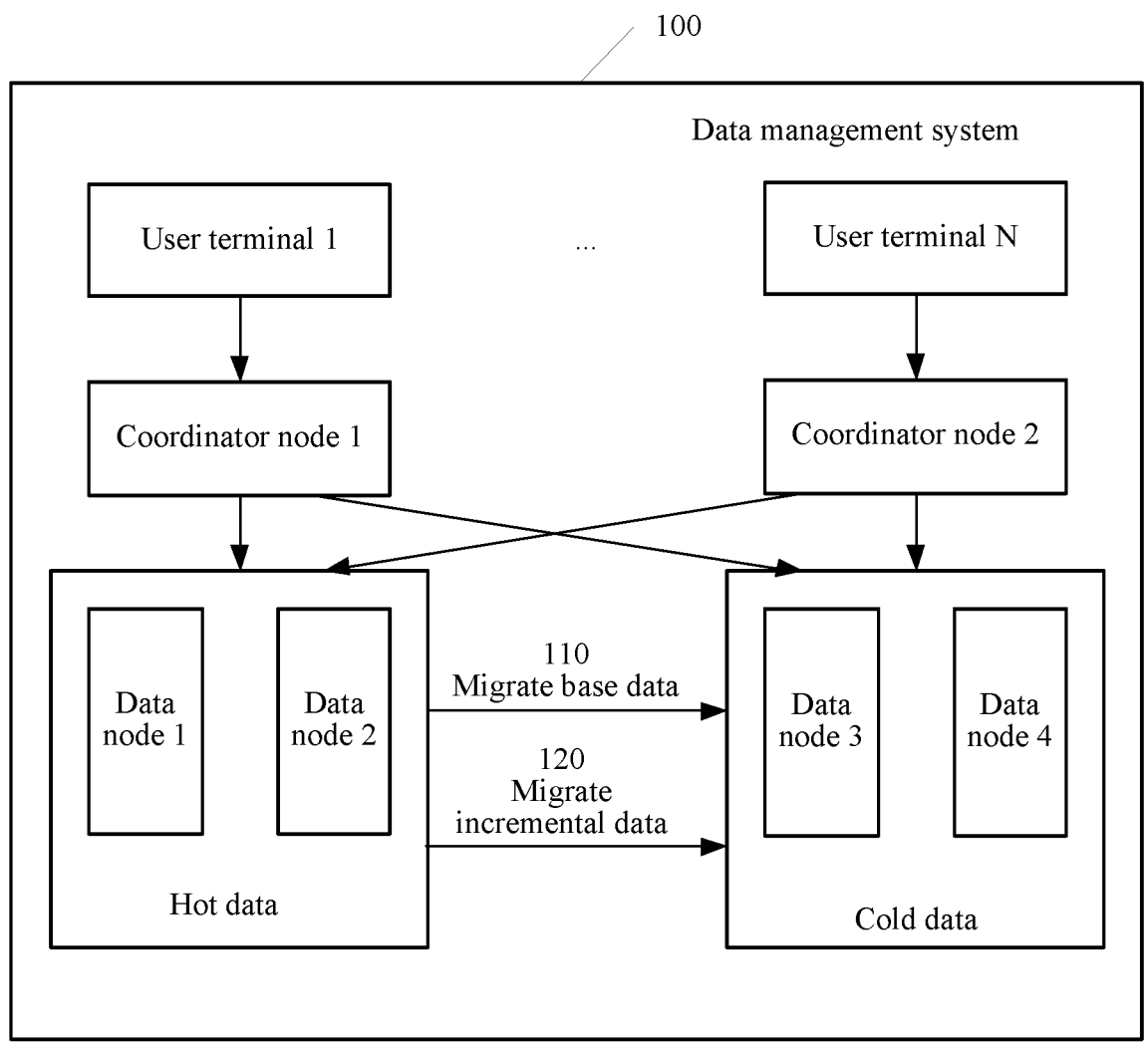
FIG. 1 is an architecture diagram of a data management system according to an embodiment.

FIG. 1 is an architecture diagram of a data management system according to an embodiment. As shown in FIG. 1, the data management system 100 may include a plurality of coordinator nodes and a plurality of data nodes. The coordinator nodes are configured to: provide interfaces for external user terminals 1 to N, receive data processing requests on service data that are sent by the user terminals, for example, query and modification, distribute the data processing requests to the data nodes, store a storage index of the service data, and so on. Positions of the plurality of coordinator nodes are peer, and user equipment may access any coordinator node to perform data processing on the service data. The data nodes are configured to store the service data, and perform the data processing requests distributed by the coordinator nodes.

The plurality of coordinator nodes and the plurality of data nodes may be respectively placed in different background service devices, to form a service device group. In an exemplary embodiment, the device group including the plurality of coordinator nodes and the plurality of data nodes is referred to as a server.

In an exemplary embodiment, service data having a time validity is respectively stored in a manner of hot data and cold data. The service data has features of a large data volume and gradually decreased accessed frequency as time passes, for example, reduction in transaction flow data and call record data.

The hot data includes a plurality of data nodes. As shown in FIG. 1, the hot data includes a data node 1 and a data node 2, configured to store service data generated recently (for example, service data in recent four months). The cold data also includes a plurality of data nodes. As shown in FIG. 1, the cold data includes a data node 3 and a data node 4, configured to store service data other than the recently generated service data (for example, service data of four months ago).

It may be understood that the hot data and the cold data are respectively stored, so that data frequently accessed and data not frequently accessed by a user may be respectively defined by using a time range as a boundary, and hot data beyond the time range needs to be periodically transferred to the cold data for storage.

According to a method in an exemplary embodiment, a time period is preset, a current service data set (that is, hot data) stored within the preset time period is defined as a first service data set, and a historical service data set (that is, cold data) stored beyond the preset time period is defined as a second service data set. When the hot data is transferred to the cold data, base data is migrated to a second service data set (referring to 110); incremental data obtained for the base data in the migration process of the base data is recorded; and the incremental data is migrated to the second service data set when the migration process of the base data is completed (referring to 120).

The user terminal may include terminal devices such as a tablet computer, a smartphone, a notebook computer, a palmtop computer, a personal computer, and a mobile Internet device (MID).

Based on the system architecture shown in FIG. 1, the following describes the data management method according to the embodiments in detail with reference to FIG. 2 to FIG. 7.

Figure 2:
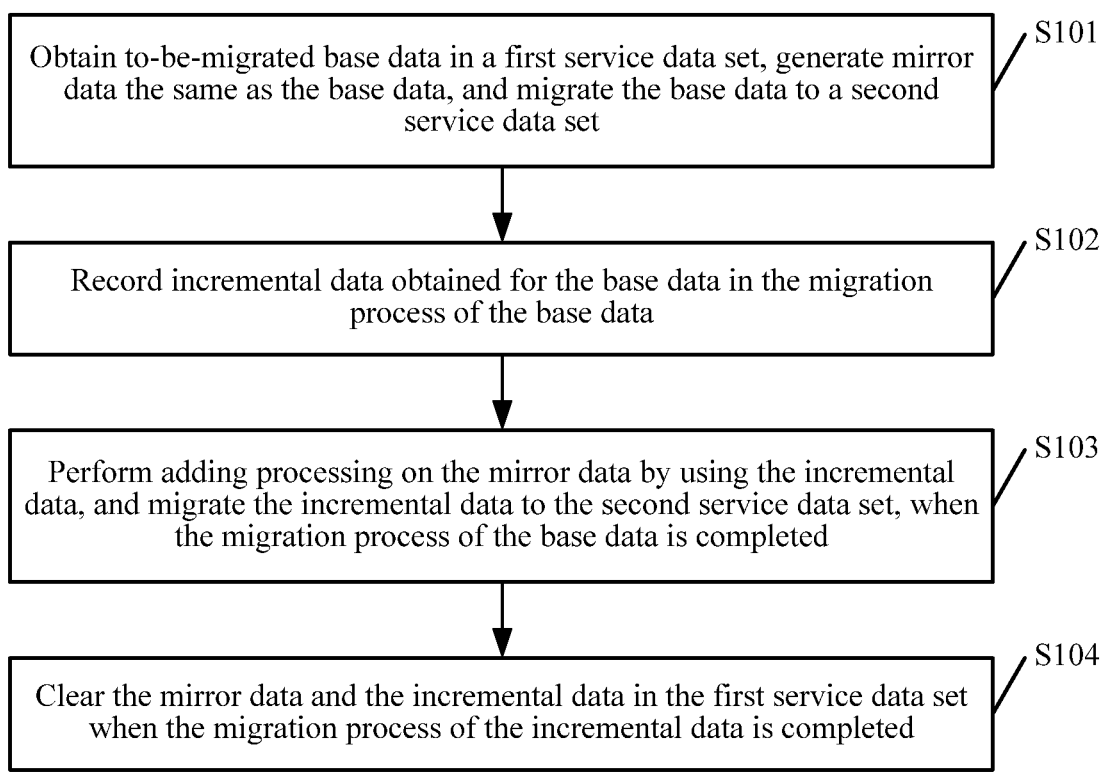
FIG. 2 is a schematic flowchart of a data management method according to an embodiment.

FIG. 2 is a schematic flowchart of a data management method according to an embodiment. As shown in FIG. 2, the method in an exemplary embodiment is applied to a server, and may include the following operation S101 to operation S104:

S101: Obtain to-be-migrated base data in a first service data set, generate mirror data that is the same as the base data, and migrate the base data to a second service data set.

Specifically, the server may obtain the to-be-migrated base data in the first service data set. It may be understood that the first service data set is a current service data set stored within a preset time period, that is, hot data, the base data is service data that needs to be transferred from the first service data set to the second service data set and that is beyond the preset time period as time passes, or the base data is service data existing in a time difference formed based on modification (for example, modifying the preset time period from recent four months to recent three months) to the preset time period by a manager, and the second service data set is a historical service data set stored beyond the preset time period, that is, cold data. The server is specifically the background service device group that includes the plurality of coordinator nodes and the plurality of data nodes.

The server may generate mirror data the same as the base data. For example, the server generates the mirror data the same as the base data in a FlashCopy manner. The server migrates the base data to the second service data.

S102: Record incremental data obtained for the base data in the migration process of the base data.

Specifically, the server may record the incremental data obtained for the base data in the process of migrating the base data from the first service data set to the second service data set. It should be noted that the incremental data is data based on which operations such as data insertion and update on the base data are to be performed in the migration process of the base data.

S103: Perform adding processing on the mirror data by using the incremental data, and migrate the incremental data to the second service data set, when the migration process of the base data is completed.

Specifically, when the migration process of the base data is completed, that is, when the base data have been migrated to the second service data set, the server may perform the adding processing on the mirror data by using the incremental data, to add the data, based on which operations such as data insertion and update on the base data are performed, to the mirror data (e.g., add the incremental data to the mirror data), and the server further needs to migrate the incremental data to the second service data set, to perform the operations such as data insertion and update on the base data.

S104: Clear the mirror data and the incremental data in the first service data set when the migration process of the incremental data is completed.

Specifically, when the migration process of the incremental data is completed, the server may update route information of the base data and the incremental data, that is, the route information of the base data and the incremental data is converted from the first service data set to the second service data set. Query, insertion, deletion, update and the like that are subsequently initiated by the user terminal on the base data and the incremental data are allocated to be performed in the second service data set, and the server simultaneously clears the mirror data in the first service data set and the incremental data in the first service data set.

In an exemplary embodiment, when the base data in the first service data set is migrated, the mirror data of the base data is generated and reserved, the base data is first migrated to the second service data set, the incremental data for the base data in the migration process of the base data is recorded, the incremental data is migrated when migration of the base data is completed, and the mirror data and the incremental data in the first service data set are cleared after migration of the incremental data is completed. This implements an online migration process of the service data, and improves efficiency of data processing on the service data, for example, query and modification, thereby quality of service is ensured.

Figure 3:
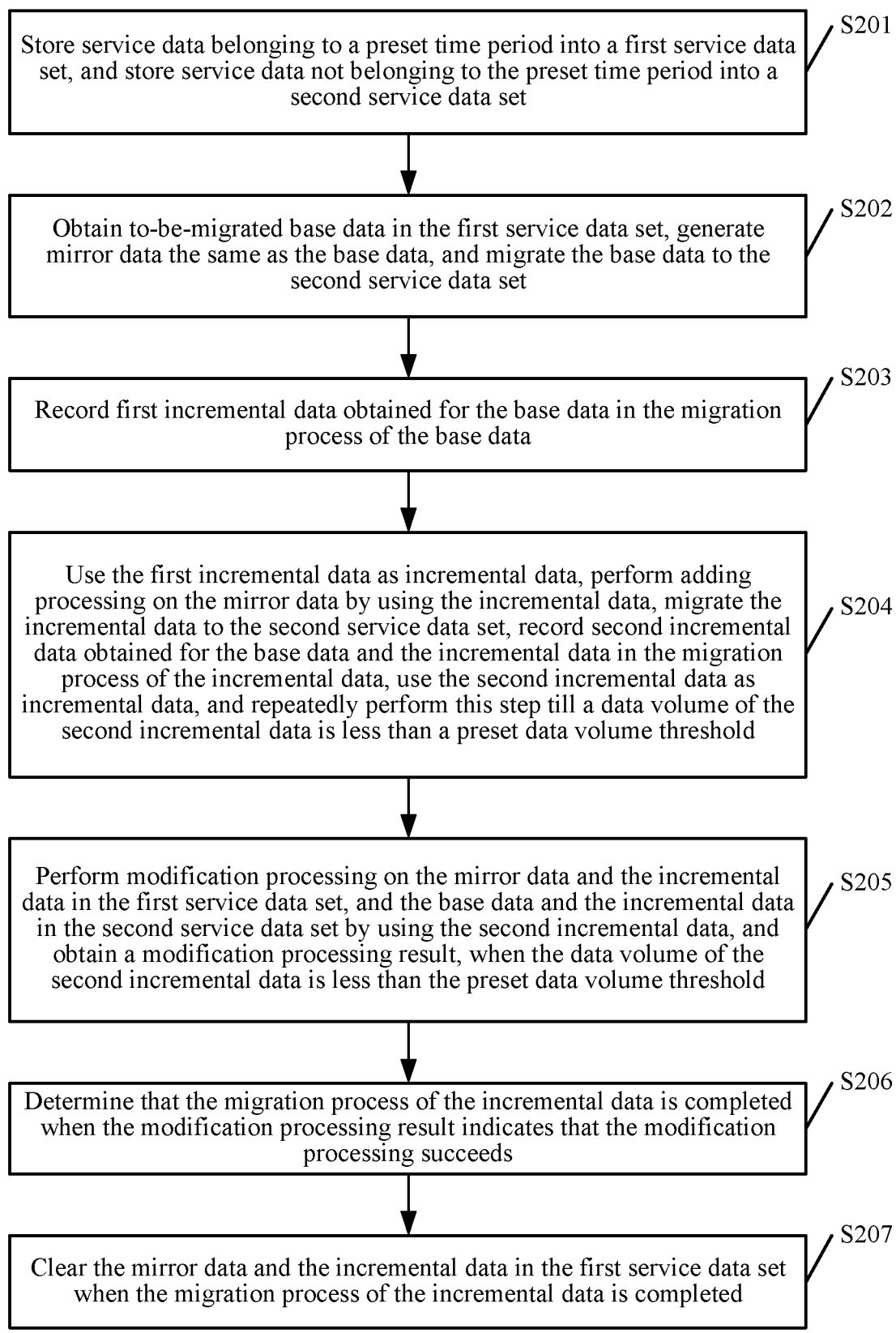
FIG. 3 is a schematic flowchart of another data management method according to an embodiment.

FIG. 3 is a schematic flowchart of another data management method according to an embodiment. As shown in FIG. 3, the method in an exemplary embodiment may include the following operation S201 to operation S207:

S201: Store service data belonging to a preset time period into a first service data set, and store service data not belonging to the preset time period into a second service data set.

Specifically, the server may store the service data belonging to the preset time period into the first service data set, and store the service data not belonging to the preset time period into the second service data set. It may be understood that the first service data set is a current service data set stored within the preset time period, that is, the hot data, and the second service data set is a historical service data set stored beyond the preset time period, that is, the cold data.

The server is specifically the background service device group that includes the plurality of coordinator nodes and the plurality of data nodes.

S202: Obtain to-be-migrated base data in the first service data set, generate mirror data the same as the base data, and migrate the base data to the second service data set.

Specifically, the server may obtain the to-be-migrated base data in the first service data set. It may be understood that the base data is service data that needs to be transferred from the first service data set to the second service data set and that is beyond the preset time period as time passes, or the base data is service data existing in a time difference formed based on modification (for example, modifying the preset time period from recent four months to recent three months) to the preset time period by a manager. The server may generate the mirror data the same as the base data. For example, the server generates the mirror data the same as the base data in a FlashCopy manner. The server migrates the base data to the second service data.

S203: Record first incremental data obtained for the base data in the migration process of the base data.

Specifically, considering that a data volume of the migrated base data is relatively large, the migration process of the base data also needs relatively long time, and in this case, a data volume of the incremental data generated in the migration process of the base data is also relatively large. Therefore, subsequent migration processing needs to be cyclically performed on the continuously generated incremental data. In an exemplary embodiment, the server records the first incremental data obtained for the base data in the migration process of the base data, and the first incremental data is used for indicating the incremental data for the base data that is generated in the migration process of the base data.

S204: Use the first incremental data as incremental data, perform adding processing on the mirror data by using the incremental data, migrate the incremental data to the second service data set, record second incremental data obtained for the base data and the incremental data in the migration process of the incremental data, use the second incremental data as incremental data, and repeatedly perform this operation until a data volume of the second incremental data is less than a preset data volume threshold.

Specifically, the server may use the first incremental data as the incremental data, perform the adding processing on the mirror data by using the incremental data, migrate the incremental data to the second service data set, record the second incremental data obtained for the base data and the incremental data in the migration process of the incremental data, use the second incremental data as the incremental data, and repeatedly perform this operation until the data volume of the second incremental data is less than the preset data volume threshold. It may be understood that the second incremental data is used for indicating incremental data for the base data and the first incremental data that is generated in the migration process of the first incremental data. The preset data volume threshold may be set by a maintainer according to an empirical value, to ensure that an impact of the second incremental data in the migration process on operations such as insertion and update that are requested to be performed by a user terminal may be ignored.

For example, it is assumed that a data volume of the first incremental data is 1 TB, it takes eight hours to migrate the first incremental data to the second service data set, a data volume of second incremental data generated in the eight hours is 0.5 TB, and it takes four hours to migrate the second incremental data to the second service data set. Also, the preset data volume threshold of the generated second incremental data is assumed to be 36 MB. In this case, a required transferring time may be one second. Therefore, when a transferring time according to the data volume of the second incremental data is quite short, processing may be further performed by using a manner of a double write operation, and incremental data generated when the second incremental data is migrated to the second service data set does not need to be recorded again.

S205: Perform modification processing on the mirror data and the incremental data in the first service data set, and the base data and the incremental data in the second service data set by using the second incremental data, and obtain a modification processing result, when the data volume of the second incremental data is less than the preset data volume threshold.

Specifically, for the double write operation, the server may simultaneously perform the modification processing on the mirror data and the incremental data in the first service data set, and the base data and the incremental data in the second service data set by using the second incremental data, when the data volume of the second incremental data is less than the preset data volume threshold. That is, the server performs operations such as data insertion and update on the mirror data and the incremental data in the first service data set by using the second incremental data, and simultaneously performs operations such as data insertion and update on the base data and the incremental data in the second service data set by using the second incremental data. By using the manner of the double write operation, based on the assumption that incremental data does not affect the operations such as insertion and update that are requested to be performed by the user terminal, migration of remaining service data and a modification process of the service data are synchronously completed in real time, and the service data in the first service data set and the second service data set may be further checked, to ensure consistency of the service data in the migration process. When the service data is found to be inconsistent, the server may close the double write operation to perform data rollback. In this case, because route information of the service data does not change, cost-free data rollback is implemented.

S206: Determine that the migration process of the incremental data is completed when the modification processing result indicates that the modification processing is successful.

Specifically, the server determines that the migration process of the incremental data is completed when the modification processing result indicates that the modification processing is successful.

Specially, in the migration process of the base data and in the migration process of the incremental data, when a query request of the user terminal for the base data or the incremental data exists, the server allocates the query request to the first service data set, and returns a query result to the user terminal.

S207: Clear the mirror data and the incremental data in the first service data set when the migration process of the incremental data is completed.

Specifically, when the migration process of the incremental data is completed, the server may update route information of the base data and the incremental data, that is, the route information of the base data and the incremental data is converted from the first service data set to the second service data set. Query, insertion, deletion, update and the like that are subsequently initiated by the user terminal on the base data and the incremental data are allocated to be performed in the second service data set, and the server simultaneously clears the mirror data in the first service data set and the incremental data in the first service data set.

In an exemplary embodiment, for the plurality of data nodes in the server, a quantity of the nodes may be adjusted according to a data volume of the service data, and the server may clear, based on a service requirement, service data that satisfies a deletion condition in the second service data set. In an exemplary embodiment, the service requirement may be a preset deletion time threshold. For example, for service data of a history of ten or more years, the server may clear service data that satisfies the deletion time threshold in the second service data set, and cleared data nodes may wait to be used again, thereby implementing dynamic allocation of the data nodes.

In an exemplary embodiment, when the base data in the first service data set is migrated, the mirror data of the base data is generated and reserved, the base data is first migrated to the second service data set, the incremental data for the base data in the migration process of the base data is recorded, the incremental data is migrated when migration of the base data is completed, and the mirror data and the incremental data in the first service data set are cleared after migration of the incremental data is completed. This implements an online migration process of the service data, and improves efficiency of data processing on the service data, for example, query and modification, thereby quality of service is ensured. By cyclically recording and migrating the incremental data, an online migration process of the service data is further implemented, and an impact on operations such as insertion and update on the service data is reduced. By using the manner of the double write operation, based on the assumption that incremental data does not affect the operations such as insertion and update that are requested to be performed by the user terminal, migration of remaining service data and a modification process of the service data are synchronously completed in real time, and the service data in the first service data set and the second service data set may be further checked, to ensure consistency of the service data in the migration process. Dynamic allocation is performed on the data nodes by using a manner of the deletion time threshold, when storage space is insufficient, a hardware device of a storage capacity of the data nodes does not need to be replaced, and hardware costs are reduced.

Figure 4:
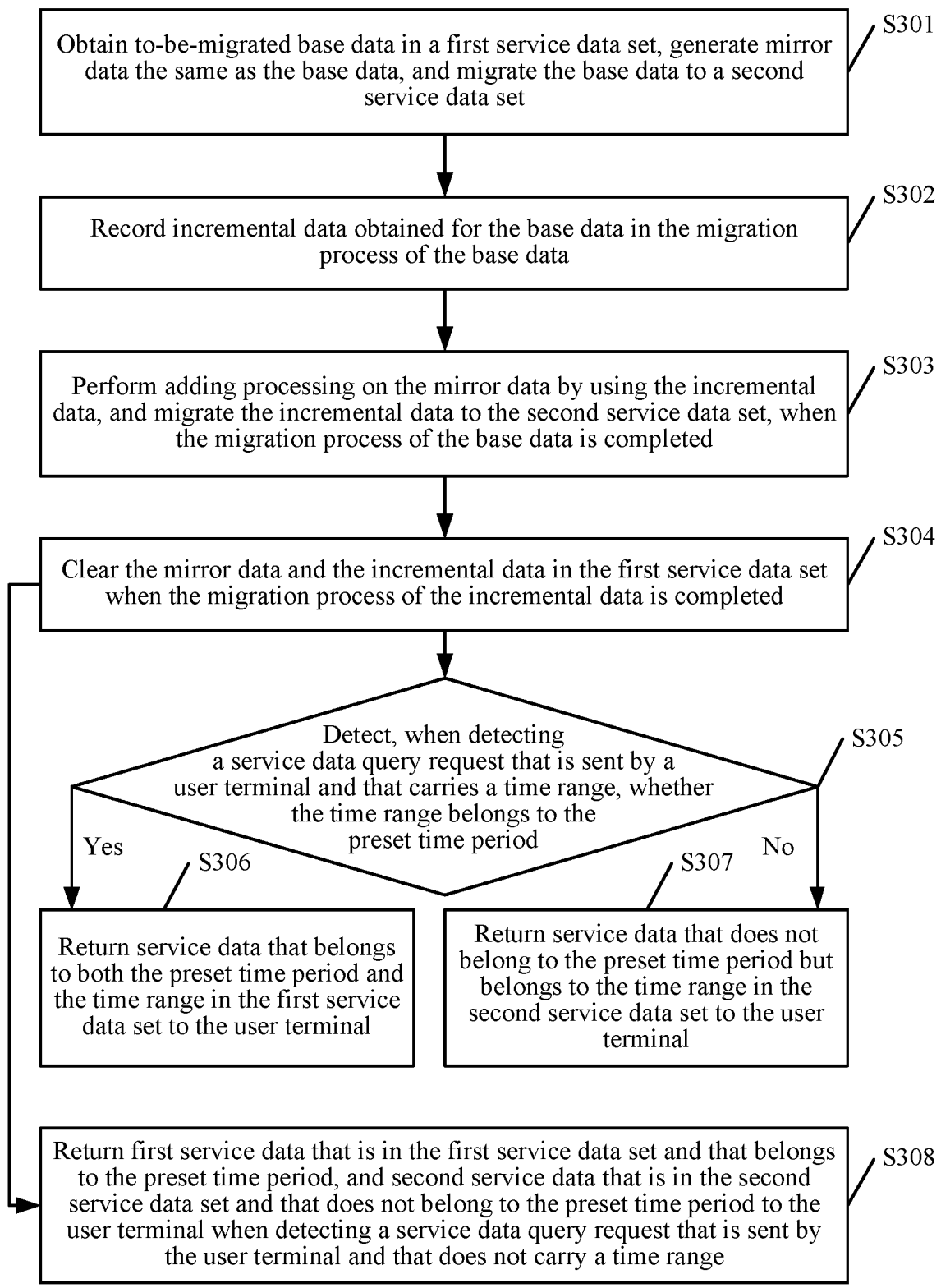
FIG. 4 is a schematic flowchart of still another data management method according to an embodiment.

FIG. 4 is a schematic flowchart of still another data management method according to an embodiment. As shown in FIG. 4, the method in an exemplary embodiment may include the following operation S301 to operation S308:

S301: Obtain to-be-migrated base data in a first service data set, generate mirror data the same as the base data, and migrate the base data to a second service data set.

S302: Record incremental data obtained for the base data in the migration process of the base data.

S303: Perform adding processing on the mirror data by using the incremental data, and migrate the incremental data to the second service data set, when the migration process of the base data is completed.

S304: Clear the mirror data and the incremental data in the first service data set when the migration process of the incremental data is completed.

S305: Detect, when detecting a service data query request that is sent by a user terminal and that carries a time range, whether the time range belongs to the preset time period.

Specifically, the server may further detect, when detecting the service data query request that is sent by the user terminal and that carries the time range, whether the time range belongs to the preset time period, if yes, operation S306 is performed; and if no, operation S307 is performed.

S306: Return service data that belongs to both the preset time period and the time range in the first service data set to the user terminal.

Specifically, when the server detects that the time range belongs to the preset time period, the server may return the service data that belongs to both the preset time period and the time range in the first service data set to the user terminal.

S307: Return service data that does not belong to the preset time period but belongs to the time range in the second service data set to the user terminal.

Specifically, when the server detects that the time range does not belong to the preset time period, the server may return the service data that does not belong to the preset time period but belongs to the time range in the second service data set to the user terminal.

S308: Return first service data that is in the first service data set and that belongs to the preset time period, and second service data that is in the second service data set and that does not belong to the preset time period to the user terminal when detecting a service data query request that is sent by the user terminal and that does not carry a time range.

Specifically, the server may return the first service data that is in the first service data set and that belongs to the preset time period, and the second service data that is in the second service data set and that does not belong to the preset time period to the user terminal when detecting the service data query request that is sent by the user terminal and that does not carry the time range.

It should be noted that in the query process, incorrect insertion of the service data may occur in a storage process, that is, service data that originally belongs to the first service data set may be stored into the second service data set, and/or service data that originally belongs to the second service data set may be stored into the first service data set. When such service data exists, the server may not return such service data to the user terminal, to protect consistency of data access.

It may be understood that a service data query process performed in the operation S305 to the operation S308 of an exemplary embodiment may not follow the performing procedure in an exemplary embodiment, that is, the user terminal may initiate the service data query process at any time.

For the operation S301 to the operation S304 in an exemplary embodiment, specific descriptions of embodiments shown in FIG. 2 and FIG. 3 may be referred, and repetitive descriptions will be avoided.

In an exemplary embodiment, when the base data in the first service data set is migrated, the mirror data of the base data is generated and reserved, the base data is first migrated to the second service data set, the incremental data for the base data in the migration process of the base data is recorded, the incremental data is migrated when migration of the base data is completed, and the mirror data and the incremental data in the first service data set are cleared after migration of the incremental data is completed. This implements an online migration process of the service data, and improves efficiency of data processing on the service data, for example, query and modification, thereby quality of service is ensured. Considering that incorrect insertion of the service data may exist in a storage process, service data that is incorrectly inserted may not be returned to the user terminal, to protect consistency of data access.

For recording and migration operations on the incremental data in FIG. 2, in a currently used PostgreSQL (object-relation database management system) database, incremental data generated by modification of various data processing services to the database is usually recorded in a manner of a log, and then the incremental data is transferred (or synchronized) to another database. That is, a current method for synchronizing the incremental data of the database needs to be implemented by using the log. There is a strong correlation between a log and a version of a database. Therefore, for two databases in different versions, synchronization of the incremental data cannot be implemented by using the log. The current method for synchronizing the incremental data of the database is implemented based on a single process, that is, all incremental data needs to be synchronized to another database by using the single process. For example, when concurrently written, the incremental data is relatively rapidly generated, and therefore the synchronization method based on the single process greatly lowers synchronization efficiency of the incremental data.

Figure 5:
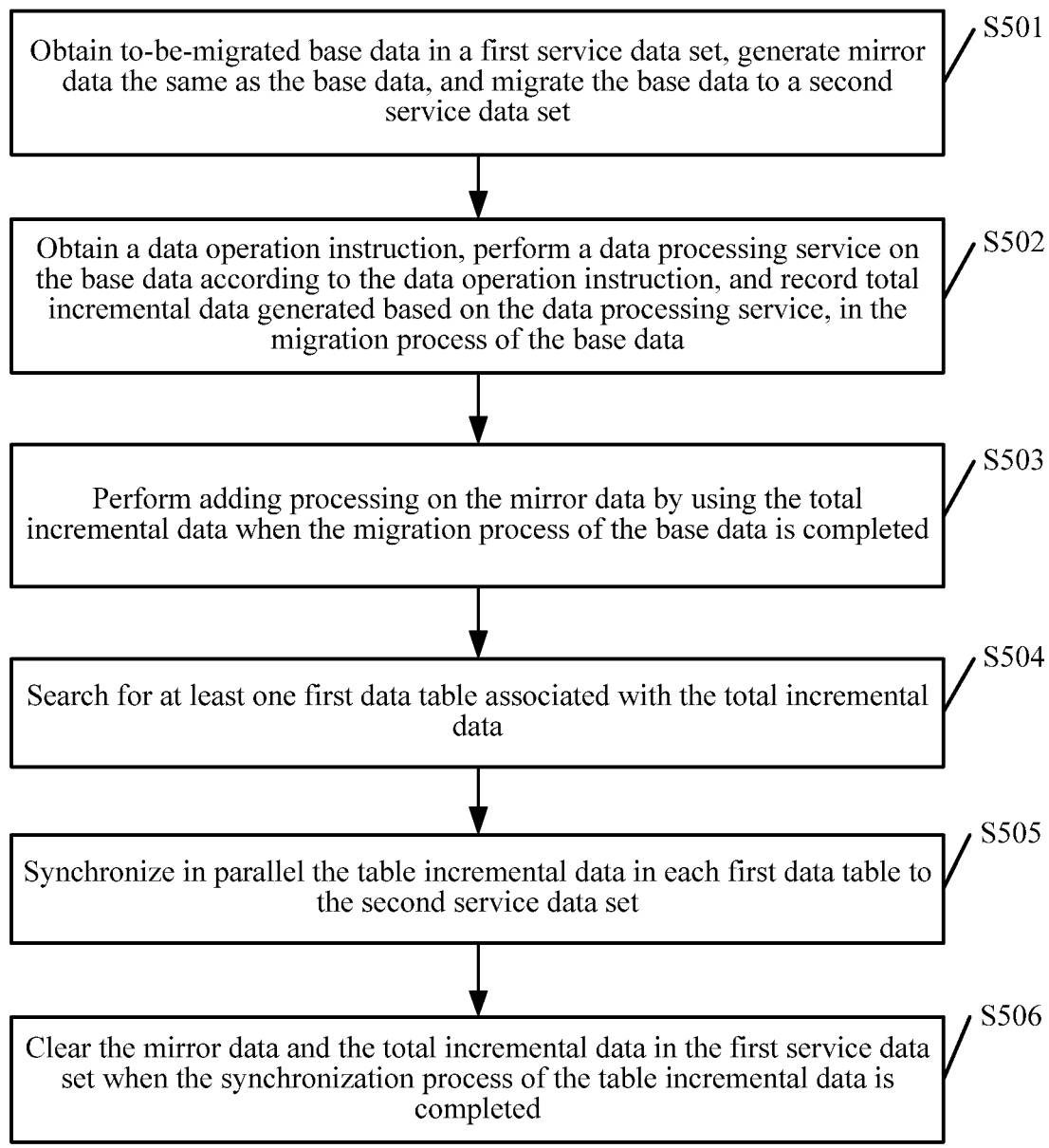
FIG. 5 is a schematic flowchart of yet another data management method according to an embodiment.

FIG. 5 is a schematic flowchart of yet another data management method according to an embodiment. A data management method according to an exemplary embodiment of FIG. 5 solves the foregoing technical problems. As shown in FIG. 5, the method in an exemplary embodiment may include the following operation S501 to operation S506:

S501: Obtain to-be-migrated base data in a first service data set, generate mirror data the same as the base data, and migrate the base data to a second service data set.

For more details about operation S501, reference may be made to the description of the operation S101, and repetitive description will be avoided.

S502: Obtain a data operation instruction, perform a data processing service on the base data according to the data operation instruction, and record total incremental data generated based on the data processing service in the migration process of the base data, the total incremental data being incremental data based on a logical statement.

By this operation, incremental data obtained for the base data in the migration process of the base data is recorded. To differentiate between the incremental data and subsequent table incremental data, the incremental data is referred to as the total incremental data herein.

Specifically, the server may obtain a data operation instruction sent by user equipment, and the data operation instruction may include a data adding instruction, a data deletion instruction, a data modification instruction, and the like. The server may further perform the data processing service according to the data operation instruction, and the data processing service may include a data adding service, a data deletion service, a data modification service, and the like performed on the base data (for ease of description, a set of the base data may be referred to as a source database) in the first service data set. For example, in the case where the data operation instruction corresponds to the data deletion instruction, the server deletes some data in a corresponding source database according to the data deletion instruction.

The total incremental data recorded by the server is the incremental data based on the logical statement, and may be specifically incremental data based on a structured query language (SQL) statement. The server may respectively record a modification operation, a deletion operation, and an adding operation that are related to each row of data in each data table in a database as a SQL statement, record data table information or database information that is related to the SQL statement, and determine the recorded SQL statement and the related data table information or database information as the total incremental data. Because the SQL statement is universal in different versions of databases, the incremental data based on the SQL statement may be synchronized between the different versions of databases.

S503: Perform adding processing on the mirror data by using the total incremental data when the migration process of the base data is completed.

For more details about operation S503, reference may be made to the description of the operation S103, and repetitive descriptions will be avoided.

S504: Search for at least one first data table associated with the total incremental data, each first data table including corresponding table incremental data, and a sum of table incremental data respectively corresponding to first data tables being the total incremental data.

Specifically, after the server records the total incremental data, the server may further detect an execution status of the data processing service, and if the execution status of the data processing service indicates a data rollback state, the server deletes the recorded total incremental data. If the execution status of the data processing service indicates a successful execution state, it means that the data processing service is successfully submitted, and the at least one first data table associated with the total incremental data may be searched for. Each first data table includes the corresponding table incremental data, and a sum of the table incremental data respectively corresponding to the first data tables is the total incremental data. If a data recording range is based on at least one second data table, the at least one second data table includes the at least one first data table.

For example, in an example where there are five second data tables and four second data tables include the incremental data (that is, the table incremental data), the four data tables including the incremental data may be determined as first data tables associated with the total incremental data.

For example, the server records the total incremental data generated based on the data processing service in the source database, and an execution operation corresponding to the data processing service relates to five data tables in the source database. The five data tables may be determined as first data tables associated with the total incremental data, incremental data generated in each first data table is the table incremental data, and a sum of table incremental data respectively corresponding to the five first data tables is the total incremental data.

For another example, if the data recording range includes a data table A, a data table B, and a data table C, and the data processing service relates to only the data table A and the data table B, that is, only the data table A and the data table B include the table incremental data. The server may determine the data table A and the data table B as first data tables associated with the total incremental data, and a sum of table incremental data respectively corresponding to the data table A and the data table B is the total incremental data.

S505: Synchronize in parallel the table incremental data in each first data table to the second service data set.

By this operation, the total incremental data is migrated to the second service data set. That is, migration is performed in a process of synchronization in parallel.

Specifically, the server may perform SQL distribution according to the first data table, so that all incremental data (that is, table incremental data) based on the SQL statement in a same first data table is synchronized by using a same process, and table incremental data in different first data tables is synchronized by respectively using different processes. Therefore, consistency of data in a first data table can be ensured, and the table incremental data in each first data table can be synchronized in parallel to the second service data set.

For example, a first data table A, a first data table B, and a first data table C exist in the server, the first data table A includes table incremental data a, the first data table B includes table incremental data b, and the first data table C includes table incremental data c. The server may synchronize the table incremental data a to the second service data set by using a first process, synchronize the table incremental data b to the second service data set by using a second process, and synchronize the table incremental data c to the second service data set by using a third process, that is, synchronize in parallel the table incremental data a, the table incremental data b, and the table incremental data c.

Compared with a method for performing single process synchronization on all incremental data by using one process, a method for performing synchronization in parallel based on a data table can greatly reduce synchronization time, that is, can improve synchronization efficiency of incremental data.

S506: Clear the mirror data and the total incremental data in the first service data set when the synchronization process of the table incremental data is completed.

For this operation, reference may be made to the description of the operation 104, and repetitive descriptions will be avoided.

In the foregoing embodiment, because the total incremental data is based on the incremental data based on the logical statement and the incremental data based on the logical statement may be used in various versions of databases, incremental data may be synchronized between the different versions of databases in an exemplary embodiment. In addition, table incremental data is respectively synchronized in parallel by using a plurality of processes, so that synchronization efficiency is effectively improved.

Figure 6:
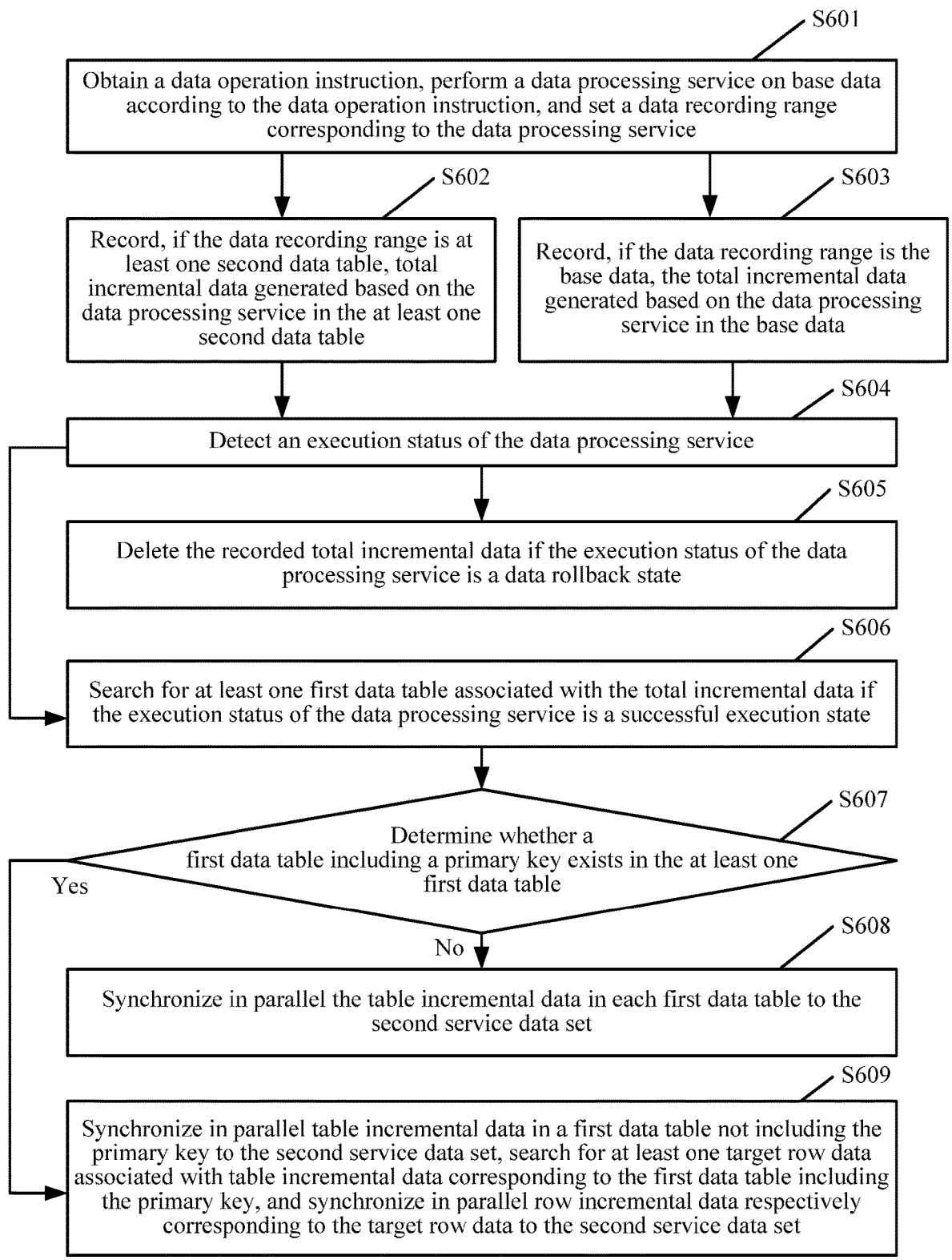
FIG. 6 is a schematic flowchart of a data synchronization method according to an embodiment.

For recording the total incremental data in the operation S02, and the synchronization operation in the operation S04 and operation S05, FIG. 6 is a schematic flowchart of a data synchronization method according to an embodiment. The method may include the following operations S601-S609:

S601: Obtain a data operation instruction, perform a data processing service on base data according to the data operation instruction, and set a data recording range corresponding to the data processing service.

Specifically, while the server performs the data processing service, the server may further set the data recording range corresponding to the data processing service, and may specifically set the data recording range according to a current service requirement. For example, the current service requirement is synchronizing modified data in a data table A and a data table B. The data recording range may be set to be the data table A and the data table B. That is, total incremental data generated based on the data processing service is subsequently recorded in only the data table A and the data table B. If modified base data in a whole source database (that is, including the base data in the first service data set) currently needs to be synchronized, the data recording range may be set to be the source database, that is, the total incremental data generated based on the data processing service may be subsequently recorded in the source database.

If the data recording range is the source database, it may be determined first whether modified data (or deleted data, or added data) corresponding to the data processing service belongs to the source database; if the modified data (or the deleted data, or the added data) corresponding to the data processing service belongs to the source database, incremental data corresponding to the modified data (or the deleted data, or the added data) may be recorded; otherwise, the corresponding incremental data is not recorded. That is, the server records the total incremental data generated based on the data processing service in only the source database. By setting the data recording range corresponding to the data processing service, incremental data in a specified data table or a database may be selectively recorded, thereby solving a problem in the related art that modification corresponding to a data table or a database that does not need attention is recorded together. Therefore, according to an exemplary embodiment, incremental data that needs to be recorded may be more flexibly selected. This can not only improve synchronization efficiency, but also save a storage resource of the server.

In an exemplary embodiment, before the operation S601, the server may first detect whether a data processing service that is being currently performed exists, and if the data processing service that is being currently performed exists, the operation S601 may be performed after the data processing service that is being currently performed is completed, to ensure the recorded total incremental data to be incremental data of a complete data processing service, and to ensure completeness of a synchronized data processing service when the total incremental data is synchronized.

S602: Record, if the data recording range corresponds to at least one second data table, total incremental data generated based on the data processing service in the at least one second data table.

Specifically, if the data recording range corresponds to the at least one second data table, it may be determined first whether modified data (or deleted data, or added data) corresponding to the data processing service belongs to the at least one second data table; if the modified data (or the deleted data, or the added data) corresponding to the data processing service belongs to the at least one second data table, incremental data corresponding to the modified data (or the deleted data, or the added data) may be recorded; otherwise, the corresponding incremental data is not recorded. That is, the server records the total incremental data generated based on the data processing service in only the at least one second data table. For example, if there are four second data tables and the data processing service is a data deletion service, the server needs only to record each data deletion operation in the four second data tables, and an operation serial number and second data table information corresponding to each data deletion operation, and determine each data deletion operation, and the operation serial number and second data table information corresponding to each data deletion operation that are recorded as the total incremental data.

The total incremental data recorded by the server is the incremental data based on the logical statement, and may be specifically incremental data based on a SQL statement. The server may respectively record a modification operation, a deletion operation and an adding operation that are related to each row of data in each data table in a database as a SQL statement, record data table information or database information that is related to the SQL statement, and determine the recorded SQL statement and the related data table information or database information as the total incremental data. Because the SQL statement is universal in different versions of databases, the incremental data based on the SQL statement may be synchronized between the different versions of databases.

S603: Record, if the data recording range is the base data, the total incremental data generated based on the data processing service in the base data.

Specifically, if the data recording range is the base data (which is referred to as the source database), it may be determined first whether modified data (or deleted data, or added data) corresponding to the data processing service belongs to the source database; if the modified data (or the deleted data, or the added data) corresponding to the data processing service belongs to the source database, incremental data corresponding to the modified data (or the deleted data, or the added data) may be recorded; otherwise, the corresponding incremental data is not recorded. That is, the server records the total incremental data generated based on the data processing service in only the source database. For example, if the server includes five databases, one of the five databases is the source database, and the data processing service is the data modification service, the server needs only to record each data modification operation in the source database, data modified by each data modification operation, an operation serial number and data table information corresponding to each data modification operation, and determine each data modification operation, the data modified by each data modification operation, and the operation serial number and data table information corresponding to each data modification operation that are recorded as the total incremental data.

In an exemplary embodiment, if the data processing service includes both the data deletion service and the data modification service, the recorded total incremental data includes both a data deletion part and a data modification part. By determining the data recording range corresponding to the data processing service, incremental data in a specified data table or a database may be selectively recorded, thereby solving a problem that modification corresponding to a data table or a database that does not need attention is recorded together. Therefore, according to an exemplary embodiment, incremental data that needs to be recorded may be more flexibly selected. This can not only improve synchronization efficiency, but also save a storage resource of the server.

The total incremental data in S603 is also the incremental data based on the SQL statement.

S604: Detect an execution status of the data processing service.

S605: Delete the recorded total incremental data if the execution status of the data processing service is a data rollback state.

Specifically, after the server records the total incremental data, the server may further detect an execution status of the data processing service, and if the execution status of the data processing service is the data rollback state, it indicates that data modified (or deleted, or added) by the data processing service has not been persistent. Therefore, the server may delete the recorded total incremental data.

S606: Search for at least one first data table associated with the total incremental data if the execution status of the data processing service is a successful execution state.

Specifically, if the execution status of the data processing service is a successful execution state, it indicates that the data processing service is successfully submitted, and the at least one first data table associated with the total incremental data may be searched for. If the data recording range is the source database, specifically, the source database may be searched for data tables in which the data processing service modifies (or deletes, or adds) data, and the found data tables are first data tables associated with the total incremental data. If the data recording range is the at least one second data table, the at least one second data table includes the at least one first data table. For example, there are five second data tables and four second data tables include the incremental data (that is, the table incremental data), the four second data tables including the incremental data may be determined as first data tables associated with the total incremental data.

Each first data table includes the corresponding table incremental data, and a sum of the table incremental data respectively corresponding to the first data tables is the total incremental data. For example, the server records the total incremental data generated based on the data processing service in the source database, an execution operation corresponding to the data processing service relates to five data tables in the source database, the five data tables may be determined as first data tables associated with the total incremental data, incremental data generated in each first data table is the table incremental data, and a sum of table incremental data respectively corresponding to the five first data tables is the total incremental data. For another example, if the data recording range includes a data table A, a data table B, and a data table C, and the data processing service relates to only the data table A and the data table B, that is, only the data table A and the data table B include the table incremental data. The server may determine the data table A and the data table B as first data tables associated with the total incremental data, and a sum of table incremental data respectively corresponding to the data table A and the data table B is the total incremental data.

S607: Determine whether a first data table including a primary key exists in the at least one first data table.

Specifically, the primary key is a Primary Key, a value of the Primary Key is unique in the first data table, and a Primary Key corresponding to each row of data in the first data table is filled in a row of the first data table.

S608: Synchronize in parallel the table incremental data in each first data table to the second service data set.

Specifically, if a determining result in S607 is 'No', that is, the first data table including the primary key does not exist in the at least one first data table, the server may perform SQL distribution according to the first data table, so that all incremental data (that is, table incremental data) based on the SQL statement in a same first data table is synchronized by using a same process, and table incremental data in different first data tables is synchronized by respectively using different processes. Therefore, consistency of data in a first data table can be ensured, and the table incremental data in each first data table can be synchronized in parallel to the second service data set (which is referred to as a target database). For example, a first data table A, a first data table B, and a first data table C exist in the server, the first data table A includes table incremental data a, the first data table B includes table incremental data b, and the first data table C includes table incremental data c. The server may synchronize the table incremental data a to the target database by using a first process, synchronize the table incremental data b to the target database by using a second process, and synchronize the table incremental data c to the target database by using a third process, that is, synchronize in parallel the table incremental data a, the table incremental data b, and the table incremental data c. Compared with a method for performing single process synchronization on all incremental data by using one process, a method for performing synchronization in parallel based on a data table can greatly reduce synchronization time, that is, can improve synchronization efficiency of incremental data.

S609: Synchronize in parallel table incremental data in a first data table not including the primary key to the second service data set, search for at least one target row data associated with table incremental data corresponding to the first data table including the primary key, and synchronize in parallel row incremental data respectively corresponding to the target row data to the second service data set.

Specifically, if the determining result in S607 is 'Yes', that is, the first data table including the primary key exists in the at least one first data table, the server may perform synchronization in parallel on the first data table not including the primary key based on the table incremental data. For more details, reference may be made to operation S505, and repetitive descriptions will be avoided.

For the first data table including the primary key, the server may first search for the at least one target row data associated with the table incremental data corresponding to the first data table including the primary key, and a sum of row incremental data respectively corresponding to target row data in the first data table is the table incremental data corresponding to the first data table.

For example, an operation performed by the data processing service relates to ten rows of data in a first data table, the ten rows of data is target row data associated with table incremental data corresponding to the first data table, and a sum of incremental data (that is, row incremental data) respectively corresponding to the ten rows of data is the table incremental data corresponding to the first data table. The server may further perform SQL distribution according to target row data. Because row incremental data corresponding to the target row data may include the Primary Key, row incremental data (which may be row incremental data including the same Primary Key in two or more first data tables) including the same Primary Key may be synchronized by using a same process, and row incremental data including different Primary Keys are synchronized by using different processes.

Because Primary Keys in a first data table are different from each other and do not repeat, a method for synchronizing row incremental data based on the Primary Keys can not only ensure consistency of data in the first data table, but also can have higher synchronization efficiency than performing synchronization in parallel based on table incremental data in the first data table. For example, a first data table in the server includes the Primary Key, and a target row data in the first data table includes row data A, row data B and row data C, the row data A includes row incremental data a, the row data B includes row incremental data b, and the row data C includes row incremental data c. The server may synchronize the row incremental data a to the target database by using a first process, synchronize the row incremental data b to the target database by using a second process, and synchronize the row incremental data c to the target database by using a third process, that is, synchronize in parallel the row incremental data a, the row incremental data b, and the row incremental data c.

In an exemplary embodiment, the data operation instruction is obtained, the data processing service is performed according to the data operation instruction, and the total incremental data generated based on the data processing service is recorded, so that at least one first data table associated with the total incremental data may be searched for, and the table incremental data in each first data table is synchronized in parallel to the target database. Because the total incremental data is the incremental data based on the logical statement and the incremental data based on the logical statement may be used in various versions of databases, incremental data may be synchronized between the different versions of databases according to an exemplary embodiment. By determining the data recording range corresponding to the data processing service, incremental data in a specified data table or a database may be selectively recorded, thereby not only improving synchronization efficiency, but also saving a storage resource of the server. In addition, table incremental data is respectively synchronized in parallel by using a plurality of processes, so that synchronization efficiency is effectively improved; and when a data table includes the primary key, table incremental data corresponding to a data table including the primary key may be further synchronized in parallel based on row incremental data, to further improve synchronization efficiency.

Figure 7:
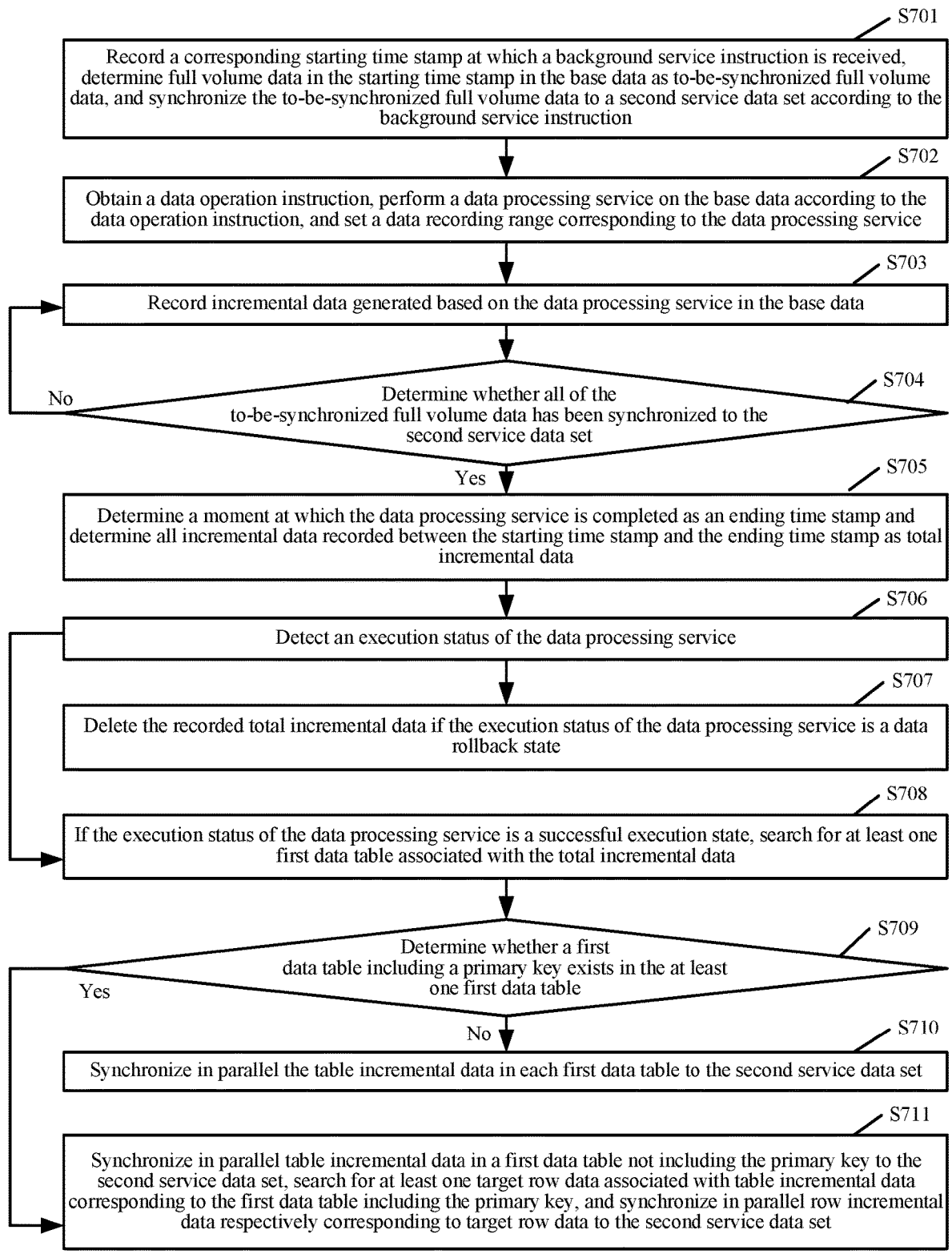
FIG. 7 is a schematic flowchart of another data synchronization method according to an embodiment.

FIG. 7 is a schematic flowchart of another data synchronization method according to an embodiment. The method may include the following operations S701-S711:

S701: Record a corresponding starting time stamp at which a background service instruction is received, determine full volume data in the starting time stamp in the base data as to-be-synchronized full volume data, and synchronize the to-be-synchronized full volume data to a second service data set according to the background service instruction.

Specifically, the background service instruction is an online upgrade instruction or a data relocation instruction. When the server receives the background service instruction, the server may record the corresponding starting time stamp at which the background service instruction is received, if the background service instruction is the online upgrade instruction, the server may create a latest version of database as a target database for representing the second service data set, and determine the full volume data (e.g., the full volume data may be all data in a source database, and it is assumed that there is no data processing service that is being performed in the server at a moment (or time) of the starting time stamp) in the starting time stamp in the source database (e.g., a database including the base data) as the to-be-synchronized full volume data, and synchronize the to-be-synchronized full volume data to the target database according to the background service instruction. If the background service instruction is the data relocation instruction, the server may use an existing database, a newly established database, and/or a database in another server as the target database, and a version of the target database may be the same as or different from a version of the source database.

In an exemplary embodiment, if a data processing service that is being performed exists in the server at the starting time stamp, and the data processing service performs an operation on a first part of data but not on a second part of data, the server may first synchronize the second part of data to the target database, and after the data processing service is completed, the server may synchronize updated first partial data obtained after the data processing service is completed to the target database.

S702: Obtain a data operation instruction, perform a data processing service on the base data according to the data operation instruction, and set a data recording range corresponding to the data processing service.

S703: Record incremental data generated based on the data processing service in the base data.

Specifically, if the server synchronizes the to-be-synchronized full volume data to the target database, the server may obtain the data operation instruction in real time from the starting time stamp, and perform the data processing service according to the data operation instruction. In this case, the server may set the data recording range as the source database, and may record incremental data generated based on the data processing service in the source database.

In an exemplary embodiment, if the server synchronizes the second part of data to the target database, the server may obtain the data operation instruction in real time from the starting time stamp, and perform the data processing service according to the data operation instruction. In this case, the server may set the data recording range as a data table related to the second part of data to serve as at least one second data table, and may record incremental data generated based on the data processing service in the at least one second data table. When starting to synchronize the updated first part of data, the server may reset the data recording range as the source database, and start to record the incremental data generated based on the data processing service in the source database.

S704: Determine whether all of the to-be-synchronized full volume data have been synchronized to the second service data set.

S705: Determine a time at which the data processing service is completed as an ending time stamp and determine all incremental data recorded between the starting time stamp and the ending time stamp as total incremental data.

Specifically, if a determining result in S704 is 'Yes', it indicates that online upgrade has been completed or data relocation has been completed. In this case, if the data processing service in the server has been completed, recording of the incremental data is stopped, and if the data processing service has not been completed yet, recording of the incremental data may not be stopped until the data processing service is completed. The server may further determine the time at which the data processing service is completed as the ending time stamp and determine all incremental data recorded between the starting time stamp and the ending time stamp as the total incremental data. If the determining result in S704 is 'No', it indicates that online upgrade has not been completed or data relocation has not been completed. Therefore, the server continues to perform operation S703, to further record new incremental data.

S706: Detect an execution status of the data processing service.

S707: Delete the recorded total incremental data if the execution status of the data processing service is a data rollback state.

S708: If the execution status of the data processing service is a successful execution state, search for at least one first data table associated with the total incremental data, each first data table including corresponding table incremental data, and a sum of table incremental data respectively corresponding to first data tables being the total incremental data.

S709: Determine whether a first data table including a primary key exists in the at least one first data table.

S710: Synchronize in parallel the table incremental data in each first data table to the second service data set.

Specifically, if a determining result in S709 is 'No', the table incremental data in each first data table is synchronized in parallel to the target database (e.g., the second service data set).

S711: Synchronize in parallel table incremental data in a first data table not including the primary key to the second service data set, search for at least one target row data associated with table incremental data corresponding to the first data table including the primary key, and synchronize in parallel row incremental data respectively corresponding to the target row data to the second service data set.

Specifically, if the determining result in S709 is 'Yes', operation S711 is performed.

For example implementations of operations S706 to S711, reference may be made to S604 to S609 in the embodiment corresponding to FIG. 6, and repetitive descriptions will be avoided.

In the whole update process or the data relocation process, the source database continues to provide a service until update is completed or relocation is completed. Table incremental data and/or row incremental data in the total incremental data recorded in the source database may be synchronized in parallel to the target database, to ensure consistency of data in the target database, and the whole service process is not interrupted. That is, transition from use of the source database to use of the target database is implemented on the premise of ensuring the service without interruption.

A server according to an embodiment is described in detail in the following with reference to FIG. 8 to FIG. 15. It should be noted that the server shown in FIG. 8 to FIG. 15 is configured to perform one or more methods in the embodiments shown in FIG. 2 to FIG. 7 of the disclosure. For ease of description, only a part related to the exemplary embodiments of FIGS. 8-15 is shown. For specific technical details that are not disclosed in FIGS. 8-15, the embodiments shown in FIG. 2 to FIG. 7 of the disclosure may be referred.

Figure 8:
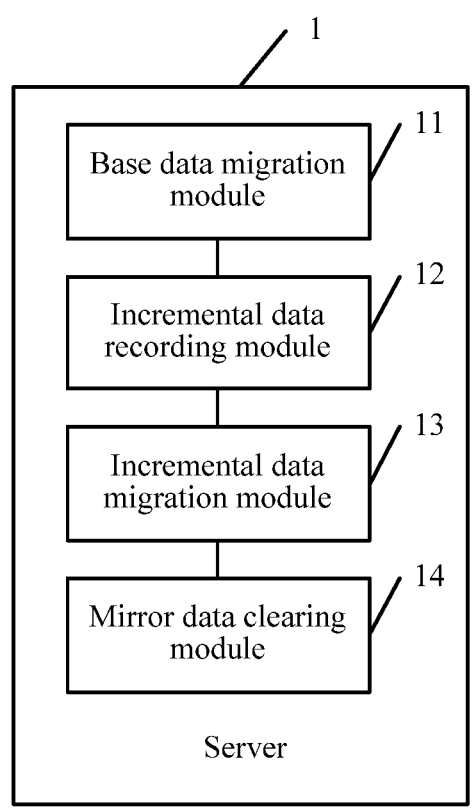
FIG. 8 is a schematic structural diagram of a server according to an embodiment.

FIG. 8 is a schematic structural diagram of a server according to an embodiment. As shown in FIG. 8, the server 1 in an exemplary embodiment may include: a base data migration module 11, an incremental data recording module 12, an incremental data migration module 13, and a mirror data clearing module 14.

The base data migration module 11 is configured to obtain to-be-migrated base data in a first service data set, generate mirror data the same as the base data, and migrate the base data to a second service data set.

The base data migration module 11 may generate the mirror data the same as the base data. For example, the base data migration module 11 generates the mirror data the same as the base data in a FlashCopy manner. The base data migration module 11 migrates the base data to the second service data.

The incremental data recording module 12 is configured to record incremental data obtained for the base data in the migration process of the base data.

In an example implementation, the incremental data recording module 12 may record the incremental data obtained for the base data in the process of migrating the base data from the first service data set to the second service data set. It should be noted that the incremental data is data that needs to perform operations such as data insertion and update on the base data in the migration process of the base data.

The incremental data migration module 13 is configured to perform adding processing on the mirror data by using the incremental data, and migrate the incremental data to the second service data set, when the migration process of the base data is completed.

In an example implementation, when the migration process of the base data is completed, that is, when the base data have been migrated to the second service data set, the incremental data migration module 13 may perform the adding processing on the mirror data by using the incremental data, to add the data, based on which operations such as data insertion and update on the base data are performed, to the mirror data, and the incremental data migration module 13 further needs to migrate the incremental data to the second service data set, to perform the operations such as data insertion and update on the base data.

The mirror data clearing module 14 is configured to clear the mirror data and the incremental data in the first service data set when the migration process of the incremental data is completed.

In an example implementation, when the migration process of the incremental data is completed, the mirror data clearing module 14 may update route information of the base data and the incremental data, that is, the route information of the base data and the incremental data is converted from the first service data set to the second service data set. Query, insertion, deletion, update and the like that are subsequently initiated by the user terminal on the base data and the incremental data are allocated to be performed in the second service data set, and the mirror data clearing module 14 simultaneously clears the mirror data in the first service data set and the incremental data in the first service data set.

Figure 9:
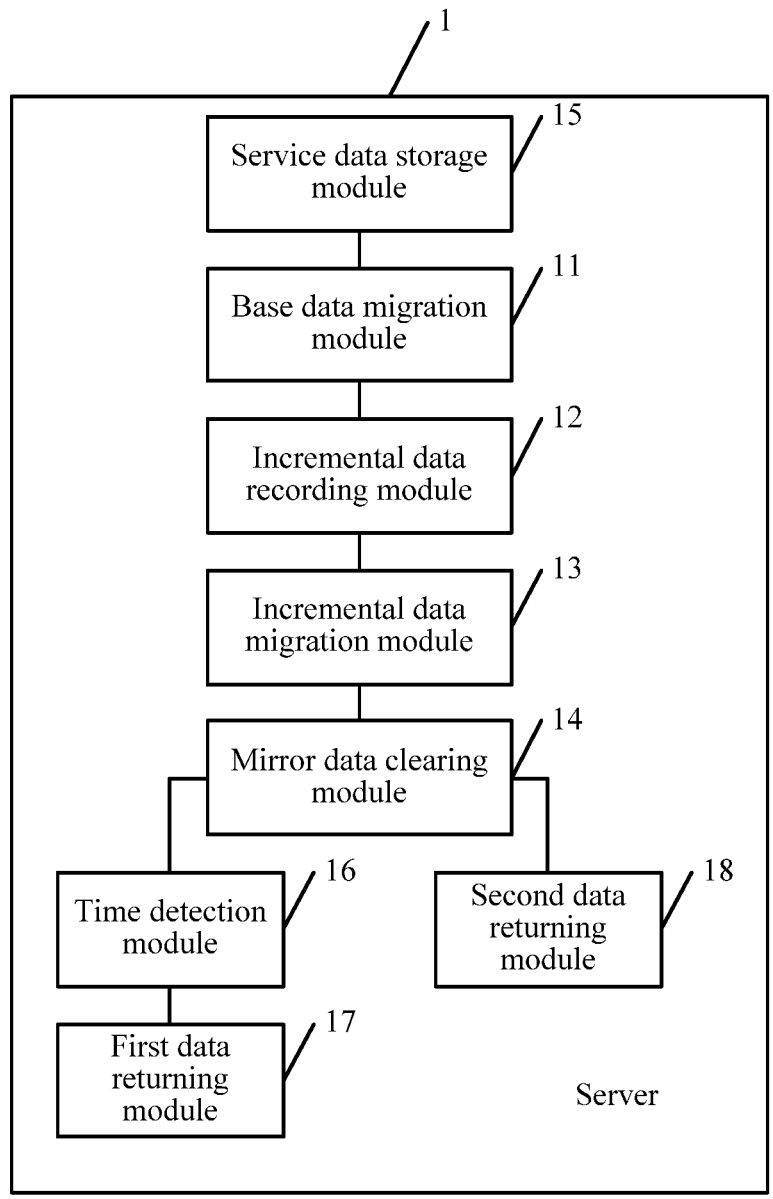
FIG. 9 is a schematic structural diagram of another server according to an embodiment.

FIG. 9 is a schematic structural diagram of another server according to an embodiment. As shown in FIG. 9, the server 1 in an exemplary embodiment may include: a base data migration module 11, an incremental data recording module 12, an incremental data migration module 13, a mirror data clearing module 14, a service data storage module 15, a time detection module 16, a first data returning module 17, and a second data returning module 18.

The service data storage module 15 is configured to store service data belonging to a preset time period into a first service data set, and store service data not belonging to the preset time period into a second service data set.

In an example implementation, the service data storage module 15 may store the service data belonging to the preset time period into the first service data set, and store the service data not belonging to the preset time period into the second service data set. It may be understood that the first service data set is a current service data set stored within the preset time period, that is, hot data, and the second service data set is a historical service data set stored beyond the preset time period, that is, cold data. The server 1 may be, for example, a background service device group that includes the plurality of coordinator nodes and the plurality of data nodes.

The base data migration module 11 is configured to obtain to-be-migrated base data in a first service data set, generate mirror data the same as the base data, and migrate the base data to a second service data set.

In an example implementation, the base data migration module 11 may obtain the to-be-migrated base data in the first service data set. It may be understood that the base data is service data that needs to be transferred from the first service data set to the second service data set and that is beyond the preset time period as time passes, or the base data is service data existing in a time difference formed based on modification (for example, modifying the preset time period from recent four months to recent three months) to the preset time period by a manager. The base data migration module 11 may generate the mirror data the same as the base data. For example, the base data migration module 11 generates the mirror data the same as the base data in a FlashCopy manner. The base data migration module 11 migrates the base data to the second service data.

The incremental data recording module 12 is configured to record incremental data obtained for the base data in the migration process of the base data.

In an example implementation, the incremental data recording module 12 may record the incremental data obtained for the base data in the process of migrating the base data from the first service data set to the second service data set. It should be noted that the incremental data is data based on which operations such as data insertion and update on the base data are performed in the migration process of the base data.

Considering that a data volume of the migrated base data is relatively large, the migration process of the base data also needs relatively long time, and in this case, a data volume of the incremental data generated in the migration process of the base data is also relatively large. Therefore, subsequent migration processing needs to be cyclically performed on the continuously generated incremental data. In an exemplary embodiment, the incremental data recording module 12 records first incremental data obtained for the base data in the migration process of the base data, and the first incremental data is used for indicating the incremental data for the base data that is generated in the migration process of the base data.

The incremental data migration module 13 is configured to perform adding processing on the mirror data by using the incremental data, and migrate the incremental data to the second service data set, when the migration process of the base data is completed.

In an example implementation, when the migration process of the base data is completed, that is, when the base data have been migrated to the second service data set, the incremental data migration module 13 may perform the adding processing on the mirror data by using the incremental data, to add the data, based on which the operations such as data insertion and update on the base data are performed, to the mirror data, and the incremental data migration module 13 further needs to migrate the incremental data to the second service data set, to perform the operations such as data insertion and update on the base data.

Figure 10:
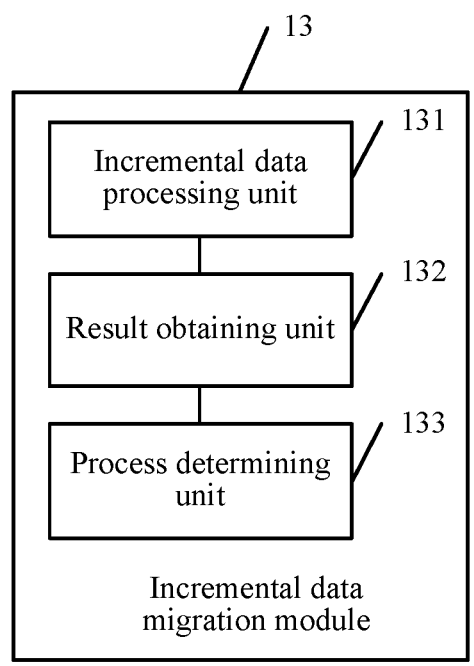
FIG. 10 is a schematic structural diagram of an incremental data migration module according to an embodiment.

FIG. 10 is a schematic structural diagram of the incremental data migration module according to an embodiment. As shown in FIG. 10, the incremental data migration module 13 may include:

an incremental data processing unit 131, configured to use the first incremental data as incremental data, perform the adding processing on the mirror data by using the incremental data, migrate the incremental data to the second service data set, record second incremental data obtained for the base data and the incremental data in the migration process of the incremental data, use the second incremental data as incremental data, and repeatedly perform this operation until a data volume of the second incremental data is less than a preset data volume threshold, when the migration process of the base data is completed;

a result obtaining unit 132, configured to perform modification processing on the mirror data and the incremental data in the first service data set, and the base data and the incremental data in the second service data set by using the second incremental data, and obtain a modification processing result, when the data volume of the second incremental data is less than the preset data volume threshold; and a process determining unit 133, configured to determine that the migration process of the incremental data is completed when the modification processing result indicates that the modification processing is successful.

Referring back to FIG. 9, the server 1 may include:

the mirror data clearing module 14, configured to clear the mirror data and the incremental data in the first service data set when the migration process of the incremental data is completed;

the time detection module 16, configured to detect, when detecting a service data query request that is sent by a user terminal and that carries a time range, whether the time range belongs to the preset time period;

the first data returning module 17, configured to return service data that belongs to both the preset time period and the time range in the first service data set to the user terminal if a detecting result of detecting, by the time detection module 16, whether the time range belongs to the preset time period is yes;

the first data returning module 17, further configured to return service data that does not belong to the preset time period but belongs to the time range in the second service data set to the user terminal if the detecting result of detecting, by the time detection module 16, whether the time range belongs to the preset time period is 'No'; and the second data returning module 18, configured to return first service data that is in the first service data set and that belongs to the preset time period, and second service data that is in the second service data set and that does not belong to the preset time period to a user terminal when detecting a service data query request that is sent by the user terminal and that does not carry a time range.

In an exemplary embodiment, when the base data in the first service data set is migrated, the mirror data of the base data is generated and reserved, the base data is first migrated to the second service data set, the incremental data for the base data in the migration process of the base data is recorded, the incremental data is migrated when migration of the base data is completed, and the mirror data and the incremental data in the first service data set are cleared after migration of the incremental data is completed.

This implements an online migration process of the service data, and improves efficiency of data processing on the service data, for example, query and modification, thereby quality of service is ensured. By cyclically recording and migrating the incremental data, an online migration process of the service data is further implemented, and an impact on operations such as insertion and update on the service data is reduced. By using the manner of the double write operation, based on that incremental data does not affect the operations such as insertion and update that are requested to be performed by the user terminal, migration of remaining service data and a modification process of the service data are synchronously completed in real time, and the service data in the first service data set and the second service data set may be further checked, to ensure consistency of the service data in the migration process. Considering that incorrect insertion of the service data exists in a storage process, service data that is incorrectly inserted may not be returned to the user terminal, to protect consistency of data access. Dynamic allocation is performed on the data nodes by using a manner of the deletion time threshold, when storage space is insufficient, a hardware device of a storage capacity of the data nodes does not need to be replaced, and hardware costs are reduced.

Figure 11:
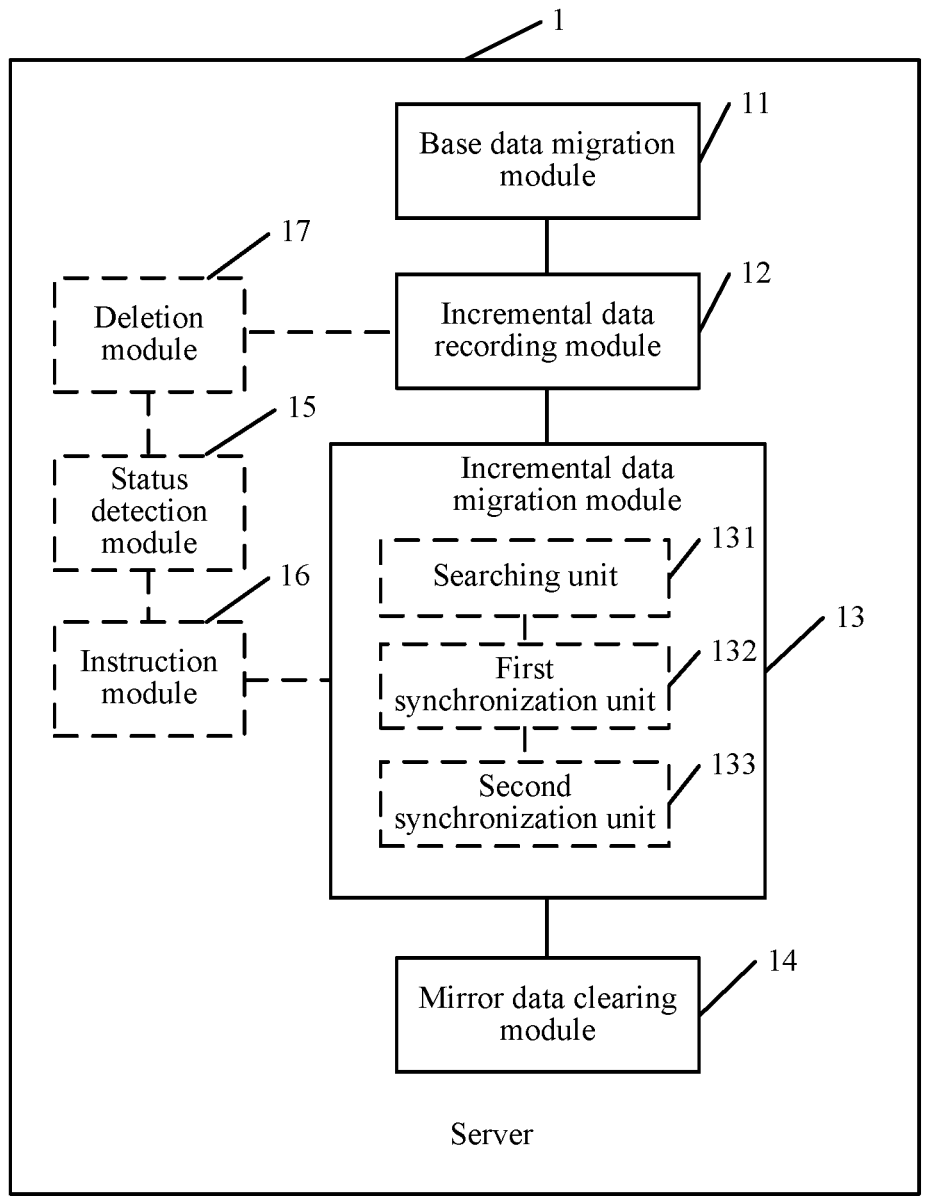
FIG. 11 is a schematic structural diagram of still another server according to an embodiment.

FIG. 11 is a schematic structural diagram of still another server according to an embodiment. As shown in FIG. 11, an incremental data recording module 12 is configured to obtain a data operation instruction, perform a data processing service on base data according to the data operation instruction, and record total incremental data generated based on the data processing service, in the migration process of the base data, the total incremental data being incremental data based on a logical statement.

An incremental data migration module 13 may include:

a searching unit 131, configured to search for at least one first data table associated with the total incremental data, each first data table including corresponding table incremental data, and a sum of table incremental data respectively corresponding to first data tables being the total incremental data; and a first synchronization unit 132, configured to synchronize in parallel the table incremental data in each first data table to the second service data set.

In an embodiment, the server 1 further includes:

a status detection module 15, configured to detect an execution status of the data processing service;

an instruction module 16, configured to instruct the searching unit 131 to search for at least one first data table associated with the total incremental data if the execution status of the data processing service is a successful execution state; and a deletion module 17, configured to delete the recorded total incremental data if the execution status of the data processing service is a data rollback state.

Figure 12:
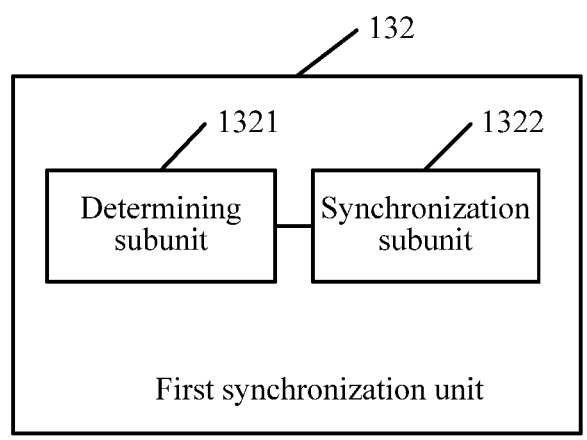
FIG. 12 is a schematic structural diagram of a first synchronization unit according to an embodiment.

FIG. 12 is a schematic structural diagram of a first synchronization unit according to an embodiment. As shown in FIG. 12, the first synchronization unit 132 may include:

a determining subunit 1321, configured to determine whether a first data table including a primary key exists in the at least one first data table; and a synchronization subunit 1322, configured to synchronize in parallel the table incremental data in each first data table to the second service data set if a determining result of the determining subunit 1321 is 'No', the synchronization subunit 1322 being further configured to: synchronize in parallel table incremental data in a first data table not including the primary key to the second service data set, search for at least one target row data associated with table incremental data corresponding to the first data table including the primary key, and synchronize in parallel row incremental data respectively corresponding to the target row data to the second service data set, if the determining result of the determining subunit 1321 is 'Yes', and a sum of row incremental data respectively corresponding to target row data in the first data table being the table incremental data corresponding to the first data table.

Figure 13:
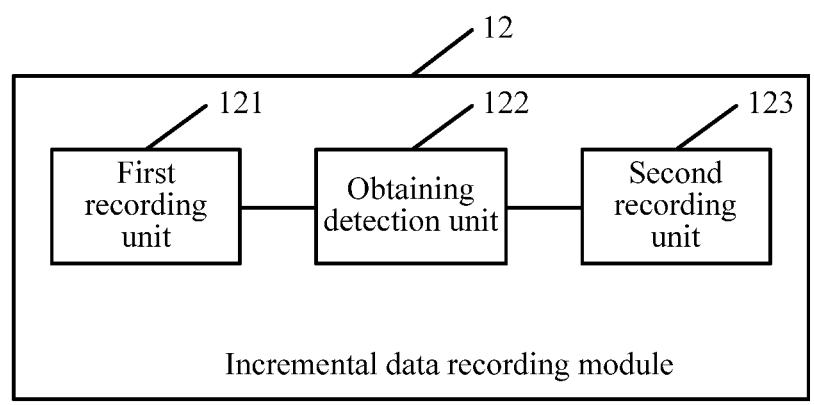
FIG. 13 is a schematic structural diagram of an incremental data recording module according to an embodiment.

FIG. 13 is a schematic structural diagram of an incremental data recording module according to an embodiment. As shown in FIG. 13, the incremental data recording module may 12 include:

an obtaining detection unit 122, configured to obtain a data operation instruction, perform the data processing service on the base data according to the data operation instruction, and set a data recording range corresponding to the data processing service;

a first recording unit 121, configured to record, if the data recording range is at least one second data table, the total incremental data generated based on the data processing service in the at least one second data table; and a second recording unit 123, configured to record, if the data recording range is the base data, the total incremental data generated based on the data processing service in the base data.

Figure 14:
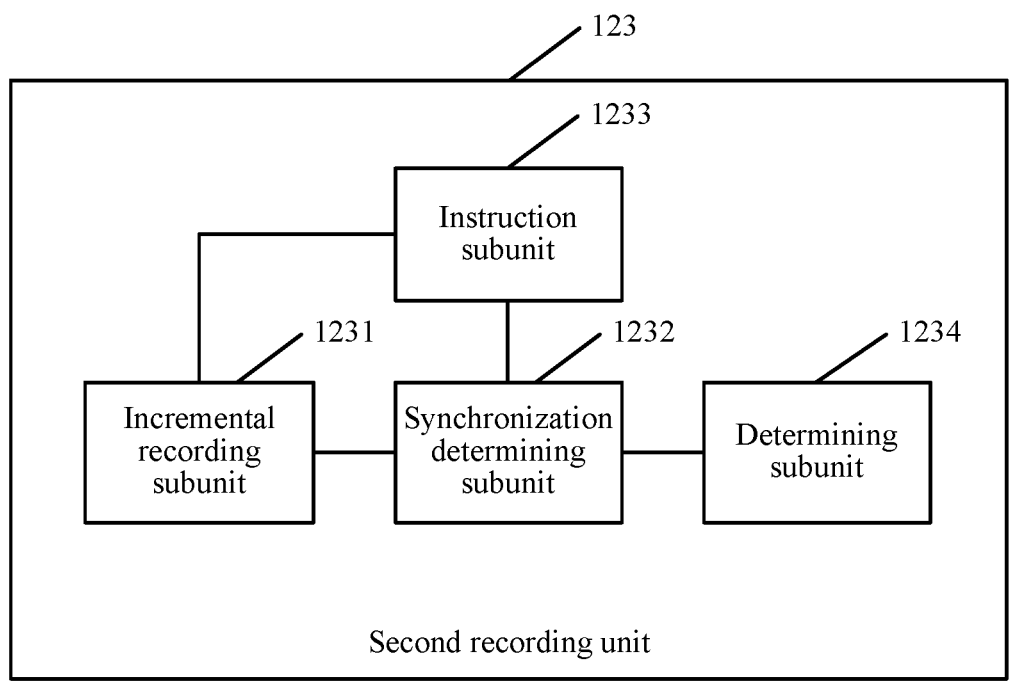
FIG. 14 is a schematic structural diagram of a second recording unit according to an embodiment.

FIG. 14 is a schematic structural diagram of a second recording unit according to an embodiment.

In an embodiment, as shown in FIG. 11, the incremental data migration module 13 further includes:

the second synchronization unit 133, configured to: record a corresponding starting time stamp at which a background service instruction is received, determine full volume data in the starting time stamp in the base data as to-be-synchronized full volume data, and synchronize the to-be-synchronized full volume data to the second service data set according to the background service instruction, the background service instruction being an online upgrade instruction or a data relocation instruction.

Correspondingly, as shown in FIG. 14, the second recording unit 123 may include:

an incremental recording subunit 1231, configured to record the incremental data generated based on the data processing service in the base data;

a synchronization determining subunit 1232, configured to determine whether all of the to-be-synchronized full volume data have been synchronized to the second service data set;

an instruction subunit 1233, configured to instruct the incremental recording subunit 1231 to continue to record the incremental data generated based on the data processing service in the base data, if a determining result of the synchronization determining subunit 1232 is 'No'; and a determining subunit 1234, configured to determine a time at which the data processing service is completed as an ending time stamp and determine all incremental data recorded between the starting time stamp and the ending time stamp as the total incremental data, if the determining result of the synchronization determining subunit 1232 is 'Yes'.

Figure 15:
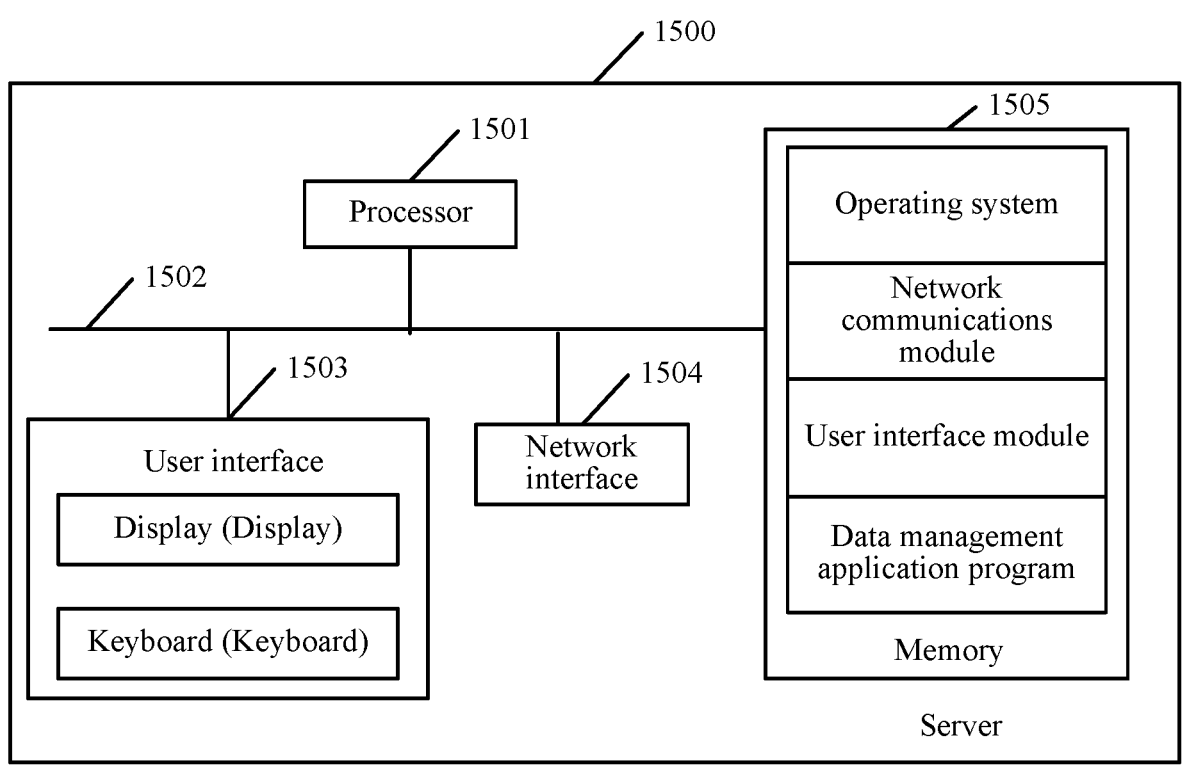
FIG. 15 is a schematic structural diagram of a server according to an embodiment.

FIG. 15 is a schematic structural diagram of yet another server according to an embodiment. As shown in FIG. 15, the server 1500 may include at least one processor 1501 such as a central processing unit (CPU), at least one network interface 1504, a user interface 1503, a memory 1505, and at least one communications bus 1502. The communications bus 1502 is configured to implement connection and communication between the components. The user interface 1503 may include a display, a keyboard, and in an exemplary embodiment, the user interface 1503 may further include a standard wired interface and a standard wireless interface. In an exemplary embodiment, the network interface 1504 may include a standard wired interface and a standard wireless interface (e.g., a WiFi interface). The memory 1505 may be a high-speed random access memory (RAM) memory, or may be a non-volatile memory, for example, at least one magnetic disk memory. In an exemplary embodiment, the memory 1505 may alternatively be at least one storage apparatus that is located far away from the processor 1501. As shown in FIG. 15, the memory 1505, which is used as a computer storage medium, may include an operating system, a network communications module, a user interface module, and a data management application program.

In the server 1500 shown in FIG. 15, the user interface 1503 is mainly configured to provide a user with an input interface and obtain data input by the user; and the processor 1501 may be configured to invoke the data management application program stored in the memory 1505 and specifically performs the following operations:

obtaining to-be-migrated base data in a first service data set, generating mirror data the same as the base data, and migrating the base data to a second service data set;

recording incremental data obtained for the base data in the migration process of the base data;

performing adding processing on the mirror data by using the incremental data, and migrating the incremental data to the second service data set, when the migration process of the base data is completed; and clearing the mirror data and the incremental data in the first service data set when the migration process of the incremental data is completed, the first service data set being a current service data set stored within a preset time period, and the second service data set being a historical service data set stored beyond the preset time period.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may be a magnetic disk, an optical disc, a read-only memory (ROM), a RAM, or the like.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

What is disclosed above is for example embodiments, and certainly is not intended to limit the protection scope of the disclosure. Therefore, equivalent variations made in accordance with the claims of the disclosure shall fall within the scope of the disclosure.

What is claimed is:

1. A data management method, performed by a sever, the method comprising:
    obtaining, by at least one processor of the server, to-be-migrated base data in a first service data set;
    generating, by the at least one processor of the server, mirror data that are same as the base data;
    performing, by the at least one processor of the server, a migration process that migrates the base data to a second service data set;
    recording, by the at least one processor of the server, incremental data obtained for the base data in the migration process of the base data;
    performing, by the at least one processor of the server, adding processing on the mirror data by using the incremental data, and migrating the incremental data to the second service data set, in response to the migration process of the base data being completed; and
    clearing, by the at least one processor of the server, the mirror data and the incremental data in the first service data set in response to the migration process of the incremental data being completed,
    the first service data set being a current service data set stored within a preset time period, and the second service data set being a historical service data set stored more than the preset time period,
    wherein the incremental data comprises a plurality of pieces of incremental data that are sequentially recorded, each of the plurality of pieces of incremental data being obtained with respect to the base data and an immediately preceding piece of incremental data that is recorded, and
    wherein the performing the adding processing and the migrating the incremental data to the second service data set comprises:
    sequentially repeating, for each of the plurality of pieces of incremental data, the adding processing on the mirror data and the migrating the incremental data until a data volume of a current piece of incremental data is less than a preset data volume threshold; and
    based on the data volume of the current piece of incremental data that is less than the preset data volume threshold being obtained while the migration process of the base data is being performed, performing the following operations:
        performing a double-write operation by:
            (i) performing a first modification processing that modifies the mirror data and the incremental data in the first service data set by using the current piece of incremental data; and
            (ii) simultaneously with the first modification processing, performing a second modification processing that modifies the base data and the incremental data in the second service data set by using the current piece of incremental data, wherein migration of remaining base data, the first modification processing, and the second modification processing are synchronously performed;
        determining that the migration process of the incremental data is completed in response to first service data in the first service data set according to a result of the first modification processing being consistent with second service data in the second service data set according to a result of the second modification processing; and
        terminating the double-write operation and performing data rollback, in response to the first service data being inconsistent with the second service data.

2. The method according to claim 1, further comprising:
    storing, by the at least one processor of the server, service data belonging to the preset time period into the first service data set, and storing service data not belonging to the preset time period into the second service data set.

3. The method according to claim 1, wherein the recording comprises:
recording first incremental data obtained for the base data in the migration process of the base data, and
wherein the performing the adding processing and migrating the incremental data to the second service data set further comprises:
by using the first incremental data as the current piece of incremental data, (i) performing the adding processing on the mirror data by using the first incremental data, (ii) migrating the first incremental data to the second service data set, and (iii) recording second incremental data obtained for the base data and the first incremental data in the migration process of the first incremental data, and by using the second incremental data as the current piece of incremental data, repeatedly performing (i)-(iii) operations until a data volume of the second incremental data is less than the preset data volume threshold.

4. The method according to claim 1, further comprising:
in response to detecting a service data query request that is sent by a user terminal and that carries a time range, determining, by the at least one processor of the server, whether the time range belongs to the preset time period;
returning, by the at least one processor of the server, service data that belongs to both the preset time period and the time range in the first service data set to the user terminal in response to determining that the time range belongs to the preset time period; and
returning, by the at least one processor of the server, service data that does not belong to the preset time period but belongs to the time range in the second service data set to the user terminal in response to determining that the time range does not belong to the preset time period.

5. The method according to claim 1, further comprising:
in response to detecting a service data query request that is sent by a user terminal and that does not carry a time range, returning, by the at least one processor of the server, first service data that is in the first service data set and that belongs to the preset time period, and second service data that is in the second service data set and that does not belong to the preset time period to the user terminal.

6. The method according to claim 1, further comprising:
clearing, by the at least one processor of the server, service data that satisfies a deletion time threshold in the second service data set.

7. The method according to claim 1, wherein the recording comprises:
obtaining a data operation instruction, performing a data processing service on the base data according to the data operation instruction, and recording total incremental data generated based on the data processing service, in the migration process of the base data, the total incremental data being incremental data based on a logical statement; and
the migrating the incremental data to the second service data set comprises:
searching for at least one first data table associated with the total incremental data, each first data table comprising corresponding table incremental data, and a sum of table incremental data respectively corresponding to first data tables being the total incremental data; and
synchronizing in parallel the table incremental data in each first data table to the second service data set.

8. The method according to claim 7, wherein the synchronizing comprises:
determining whether a first data table comprising a primary key exists in the at least one first data table;
in response to the first data table comprising the primary key not existing in the at least one first data table, synchronizing in parallel the table incremental data in each first data table to the second service data set; and
in response to the first data table comprising the primary key existing in the at least one first data table, synchronizing in parallel the table incremental data in the first data table not comprising the primary key to the second service data set, searching for at least one target row data associated with table incremental data corresponding to the first data table comprising the primary key, and synchronizing in parallel row incremental data respectively corresponding to the at least one target row data to the second service data set,
a sum of row incremental data respectively corresponding to at least one target row data in the first data table being the table incremental data corresponding to the first data table.

9. The method according to claim 7, wherein
the performing the data processing service on the base data according to the data operation instruction comprises performing the data processing service on the base data according to the data operation instruction, and setting a data recording range corresponding to the data processing service, and
the recording the total incremental data comprises:
in response to the data recording range being at least one second data table, recording the total incremental data generated based on the data processing service in the at least one second data table; and
in response to the data recording range being the base data, recording the total incremental data generated based on the data processing service in the base data.

10. The method according to claim 7, further comprising:
detecting an execution status of the data processing service;
performing the searching for the at least one first data table associated with the total incremental data in response to the execution status of the data processing service being a successful execution state; and
deleting the recorded total incremental data in response to the execution status of the data processing service being a data rollback state.

11. The method according to claim 9, further comprising:
recording a corresponding starting time stamp at which a background service instruction is received, determining full volume data in the starting time stamp in the base data as to-be- synchronized full volume data, and synchronizing the to-be-synchronized full volume data to the second service data set according to the background service instruction, wherein
the recording the total incremental data generated based on the data processing service in the base data comprises:
recording incremental data generated based on the data processing service in the base data;
determining whether all of the to-be-synchronized full volume data have been synchronized to the second service data set;
continuing to perform the recording incremental data generated based on the data processing service in the base data in response to all of the to-be-synchronized full volume data not having been synchronized to the second service data set; and determining a time at which the data processing service is completed as an ending time stamp and determining all incremental data recorded between the starting time stamp and the ending time stamp as the total incremental data, in response to all of the to-be-synchronized full volume data having been synchronized to the second service data set.

12. A server, comprising at least one processor and at least one memory, the at least one memory storing instructions that can be executed by the at least one processor, and when executing the instructions, the at least one processor being configured to:

obtain to-be-migrated base data in a first service data set;

generate mirror data that are same as the base data;

perform a migration process that migrates the base data to a second service data set;

record incremental data obtained for the base data in the migration process of the base data;

perform adding processing on the mirror data by using the incremental data, and migrate the incremental data to the second service data set, in response to the migration process of the base data being completed; and clear the mirror data and the incremental data in the first service data set in response to the migration process of the incremental data being completed, the first service data set being a current service data set stored within a preset time period, and the second service data set being a historical service data set stored more than the preset time period, wherein the incremental data comprises a plurality of pieces of incremental data that are sequentially recorded, each of the plurality of pieces of incremental data being obtained with respect to the base data and an immediately preceding piece of incremental data that is recorded, wherein when executing the instructions, the at least one processor is further configured to:

sequentially repeat, for each of the plurality of pieces of incremental data, the adding processing on the mirror data and the migrating the incremental data until a data volume of a current piece of incremental data is less than a preset data volume threshold; and based on the data volume of the current piece of incremental data that is less than the preset data volume threshold being obtained while the migration process of the base data is being performed, perform the following operations:

performing a double-write operation by:

(i) performing perform a first modification processing that modifies the mirror data and the incremental data in the first service data set by using the current piece of incremental data; and (ii) simultaneously with the first modification processing, performing perform a second modification processing that modifies the base data and the incremental data in the second service data set by using the current piece of incremental data, wherein migration of remaining base data, the first modification processing, and the second modification processing are synchronously performed;

determining that the migration process of the incremental data is completed in response to first service data in the first service data set according to a result of the first modification processing being consistent with second service data in the second service data set according to a result of the second modification processing; and terminating the double-write operation and perform data rollback, in response to the first service data being inconsistent with the second service data.

13. The server according to claim 12, wherein, when executing the instructions, the at least one processor is further configured to:

store service data belonging to the preset time period into the first service data set, and store service data not belonging to the preset time period into the second service data set.

14. The server according to claim 12, wherein, when executing the instructions, the at least one processor is further configured to:

record first incremental data obtained for the base data in the migration process of the base data; and use the first incremental data as the current piece of incremental data, perform the adding processing on the mirror data by using the first incremental data, migrate the first incremental data to the second service data set, record second incremental data obtained for the base data and the first incremental data in the migration process of the first incremental data, use the second incremental data as the current piece of incremental data, and repeatedly perform this operation until a data volume of the second incremental data is less than the preset data volume threshold, when the migration process of the base data is completed.

15. The server according to claim 12, wherein, when executing the instructions, the at least one processor is further configured to:

in response to detecting a service data query request that is sent by a user terminal and that carries a time range, determining whether the time range belongs to the preset time period;

return service data that belongs to both the preset time period and the time range in the first service data set to the user terminal in response to determining that the time range belongs to the preset time period; and return service data that does not belong to the preset time period but belongs to the time range in the second service data set to the user terminal in response to determining that the time range does not belong to the preset time period.

16. The server according to claim 12, wherein, when executing the instructions, the at least one processor is further configured to:

in response to detecting a service data query request that is sent by a user terminal and that does not carry a time range, return first service data that is in the first service data set and that belongs to the preset time period, and second service data that is in the second service data set and that does not belong to the preset time period to the user terminal.

17. The server according to claim 12, wherein, when executing the instructions, the at least one processor is further configured to:

clear service data that satisfies a deletion time threshold in the second service data set.

18. The server according to claim 12, wherein, when executing the instructions, the at least one processor is further configured to:

obtain a data operation instruction, perform a data processing service on the base data according to the data operation instruction, and record total incremental data generated based on the data processing service, in the migration process of the base data, the total incremental data being incremental data based on a logical statement;

search for at least one first data table associated with the total incremental data, each first data table comprising corresponding table incremental data, and a sum of table incremental data respectively corresponding to first data tables being the total incremental data; and synchronize in parallel the table incremental data in each first data table to the second service data set.

19. The server according to claim 18, wherein, when executing the instructions, the at least one processor is further configured to:

determine whether a first data table comprising a primary key exists in the at least one first data table;

in response to the first data table comprising the primary key not existing in the at least one first data table, synchronize in parallel the table incremental data in each first data table to the second service data set; and in response to the first data table comprising the primary key existing in the at least one first data table, synchronize in parallel the table incremental data in the first data table not comprising the primary key to the second service data set, search for at least one target row data associated with table incremental data corresponding to the first data table comprising the primary key, and synchronize in parallel row incremental data respectively corresponding to the at least one target row data to the second service data set, a sum of row incremental data respectively corresponding to at least one target row data in the first data table being the table incremental data corresponding to the first data table.

20. A non-transitory computer readable storage medium, storing computer readable instructions, which, when executed by at least one processor, cause the at least one processor to:

obtain to-be-migrated base data in a first service data set;

generate mirror data that are same as the base data;

perform a migration process that migrates the base data to a second service data set;

record incremental data obtained for the base data in the migration process of the base data;

perform adding processing on the mirror data by using the incremental data, and migrate the incremental data to the second service data set, in response to the migration process of the base data being completed; and clear the mirror data and the incremental data in the first service data set in response to the migration process of the incremental data being completed, the first service data set being a current service data set stored within a preset time period, and the second service data set being a historical service data set stored more than the preset time period, wherein the incremental data comprises a plurality of pieces of incremental data that are sequentially recorded, each of the plurality of pieces of incremental data being obtained with respect to the base data and an immediately preceding piece of incremental data that is recorded, and wherein the computer readable instructions, when executed by the at least one processor, further cause the at least one processor to:

sequentially repeat, for each of the plurality of pieces of incremental data, the adding processing on the mirror data and the migrating the incremental data until a data volume of a current piece of incremental data is less than a preset data volume threshold; and based on the data volume of the current piece of incremental data that is less than a preset data volume threshold being obtained while the migration process of the base data is being performed, perform the following operations:

performing a double-write operation by:
(i) performing perform a first modification processing that modifies the mirror data and the incremental data in the first service data set by using the current piece of incremental data; and
(ii) simultaneously with the first modification processing, performing perform a second modification processing that modifies the base data and the incremental data in the second service data set by using the current piece of incremental data, wherein migration of remaining base data, the first modification processing, and the second modification processing are synchronously performed;

determining that the migration process of the incremental data is completed in response to first service data in the first service data set according to a result of the first modification processing being consistent with second service data in the second service data set according to a result of the second modification processing; and terminating the double-write operation and perform data rollback, in response to the first service data being inconsistent with the second service data.

* * * * *